(12) United States Patent
Sugiyama et al.

(10) Patent No.: US 10,866,800 B2
(45) Date of Patent: Dec. 15, 2020

(54) INFORMATION PROCESSING SYSTEM, CLIENT TERMINAL, AND CONTROL METHOD

(71) Applicant: Ricoh Company, Ltd., Tokyo (JP)

(72) Inventors: Kanami Sugiyama, Kanagawa (JP); Takeo Mochizuki, Kanagawa (JP); Daichi Kamoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/321,889

(22) PCT Filed: Aug. 1, 2017

(86) PCT No.: PCT/JP2017/027842
§ 371 (c)(1),
(2) Date: Jan. 30, 2019

(87) PCT Pub. No.: WO2018/025843
PCT Pub. Date: Feb. 8, 2018

(65) Prior Publication Data
US 2019/0179627 A1 Jun. 13, 2019

(30) Foreign Application Priority Data
Aug. 4, 2016 (JP) .................................. 2016-153502

(51) Int. Cl.
*H04M 3/00* (2006.01)
*G06F 8/654* (2018.01)
(Continued)

(52) U.S. Cl.
CPC .............. *G06F 8/654* (2018.02); *G06F 11/00* (2013.01); *H04L 67/34* (2013.01); *H04L 67/42* (2013.01);
(Continued)

(58) Field of Classification Search
None
See application file for complete search history.

(56) References Cited

U.S. PATENT DOCUMENTS

| | | | | |
|---|---|---|---|---|
| 2004/0243993 | A1* | 12/2004 | Okonnen | G06F 8/65 717/168 |
| 2008/0005733 | A1* | 1/2008 | Ramachandran | G06F 8/65 717/168 |

(Continued)

FOREIGN PATENT DOCUMENTS

| | | |
|---|---|---|
| JP | 2004-104533 | 4/2004 |
| JP | 2005-229279 | 8/2005 |

(Continued)

OTHER PUBLICATIONS

International Search Report dated Oct. 3, 2017 in PCT/JP2017/027842 filed on Aug. 1, 2017.

(Continued)

Primary Examiner — Erika A Washington
(74) Attorney, Agent, or Firm — IPUSA, PLLC

(57) ABSTRACT

An information processing system includes an electronic apparatus having firmware installed therein, and a client terminal configured to be communicably coupled to the electronic apparatus or to a server configured to provide the firmware through switching between the electronic apparatus and a network to a coupling destination. The client terminal includes a firmware acquisition control unit configured to acquire firmware from the server apparatus to store the acquired firmware in a firmware storage in response to the client terminal being communicably coupled to the server apparatus, and a firmware update control unit configured to update the firmware installed in the electronic apparatus to the firmware stored in the firmware storage in response to the client terminal being communicably coupled to the electronic apparatus.

19 Claims, 21 Drawing Sheets

(51) Int. Cl.
    *G06F 11/00*     (2006.01)
    *H04L 29/08*     (2006.01)
    *H04L 29/06*     (2006.01)
    *H04W 8/24*     (2009.01)
    *H04W 52/02*     (2009.01)
    *H04W 84/12*     (2009.01)
    *H04W 88/02*     (2009.01)

(52) U.S. Cl.
    CPC ....... *H04W 8/245* (2013.01); *H04W 52/0277* (2013.01); *H04W 84/12* (2013.01); *H04W 88/02* (2013.01)

(56) References Cited

U.S. PATENT DOCUMENTS

| | | |
|---|---|---|
| 2008/0052698 A1 | 2/2008 | Olson et al. |
| 2009/0077549 A1 | 3/2009 | Sadja et al. |
| 2013/0227540 A1 | 8/2013 | Ruster et al. |
| 2014/0282483 A1 | 9/2014 | Zhang et al. |
| 2015/0007161 A1* | 1/2015 | Yagi .......................... G06F 8/65 717/171 |
| 2016/0036956 A1 | 2/2016 | Debates et al. |
| 2016/0156721 A1 | 6/2016 | Kumagai |
| 2016/0165142 A1 | 6/2016 | Hada |
| 2017/0102934 A1 | 4/2017 | Xu |
| 2019/0205114 A1 | 7/2019 | Hamakawa |

FOREIGN PATENT DOCUMENTS

| | | |
|---|---|---|
| JP | 2010-204430 | 9/2010 |
| JP | 2016-111569 | 6/2016 |
| JP | 2017-525059 | 8/2017 |
| KR | 10-1091464 | 12/2011 |

OTHER PUBLICATIONS

Extended European Search report for 17836947.6 dated Aug. 1, 2019.

Office Action dated Oct. 1, 2019 issued to related U.S. Appl. No. 16/182,649.

Office Action dated Mar. 19, 2020 issued to related U.S. Appl. No. 16/182,649.

Japanese Office Action for 2016-153502 dated Mar. 24, 2020.

* cited by examiner

[Fig. 1A]
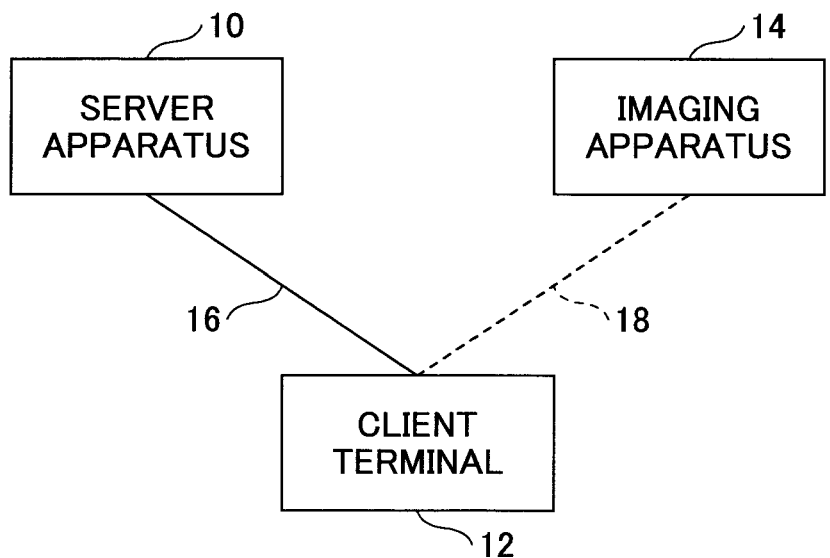
[Fig. 1B]
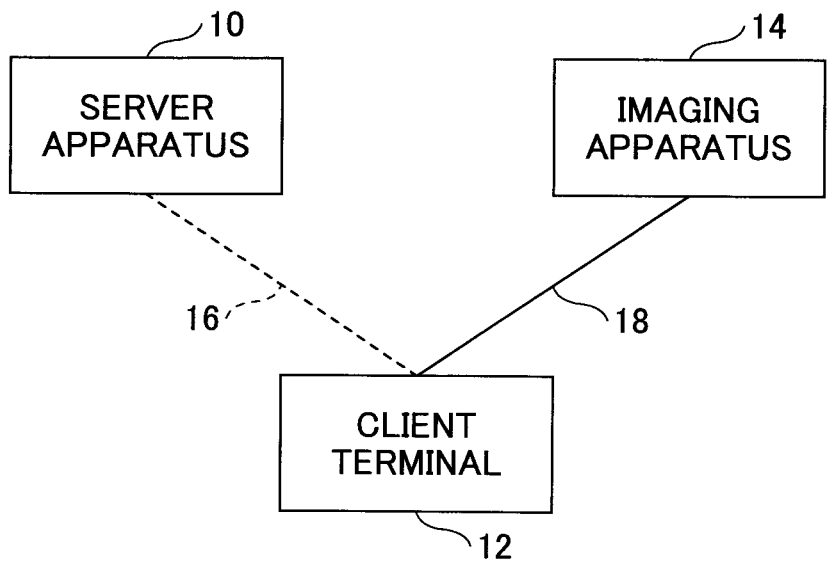

[Fig. 2]
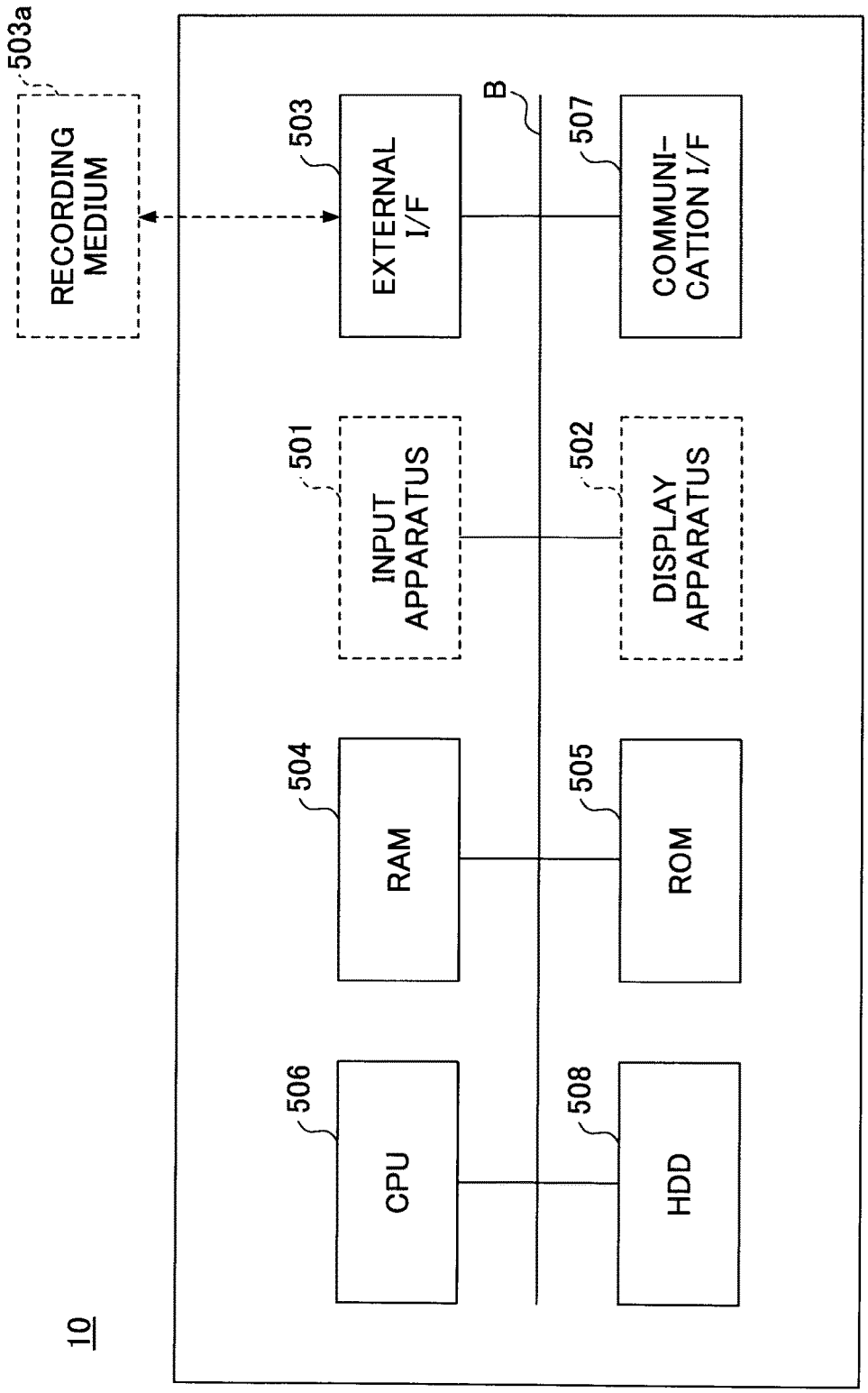

[Fig. 3]
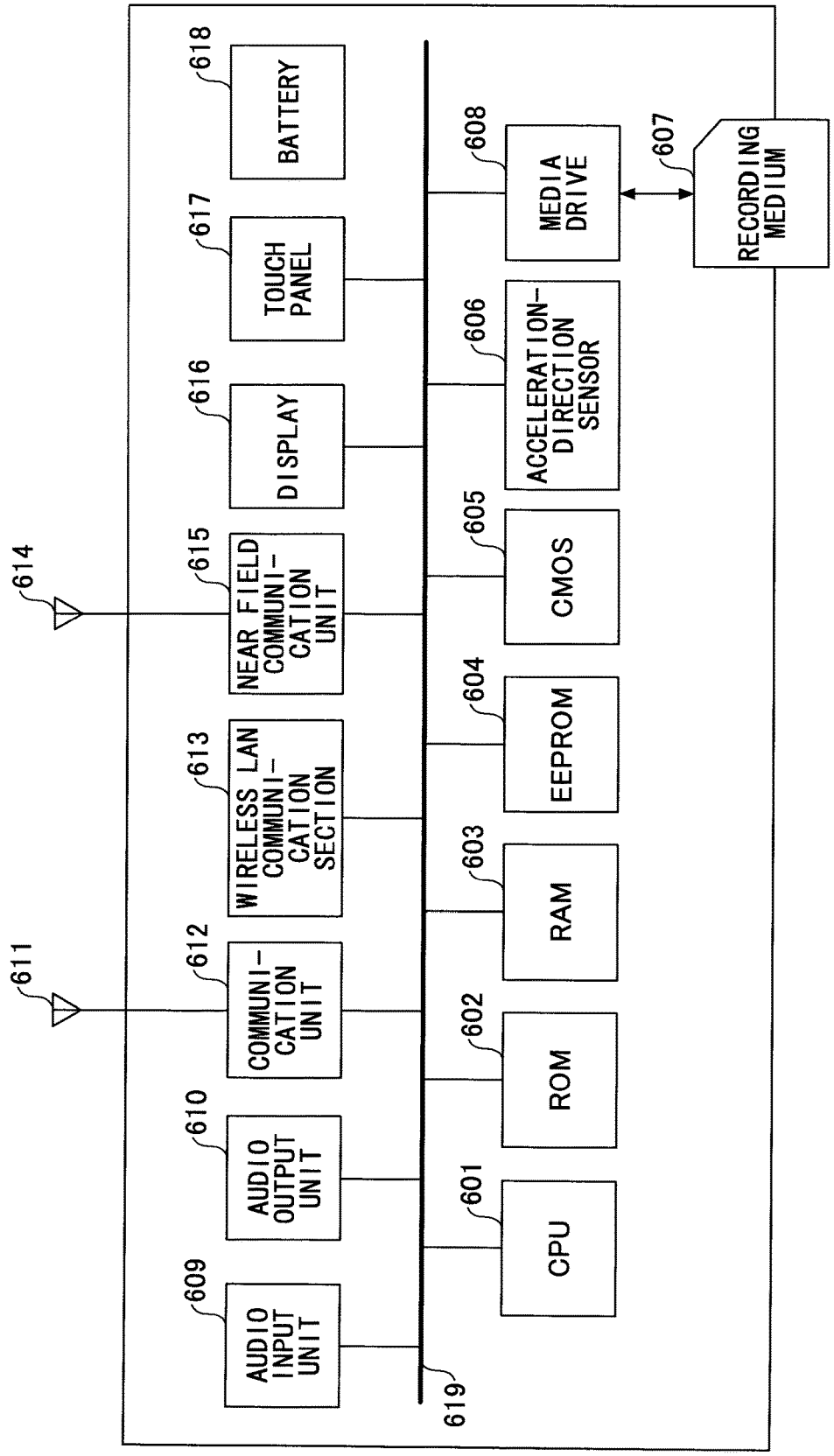

[Fig. 4]
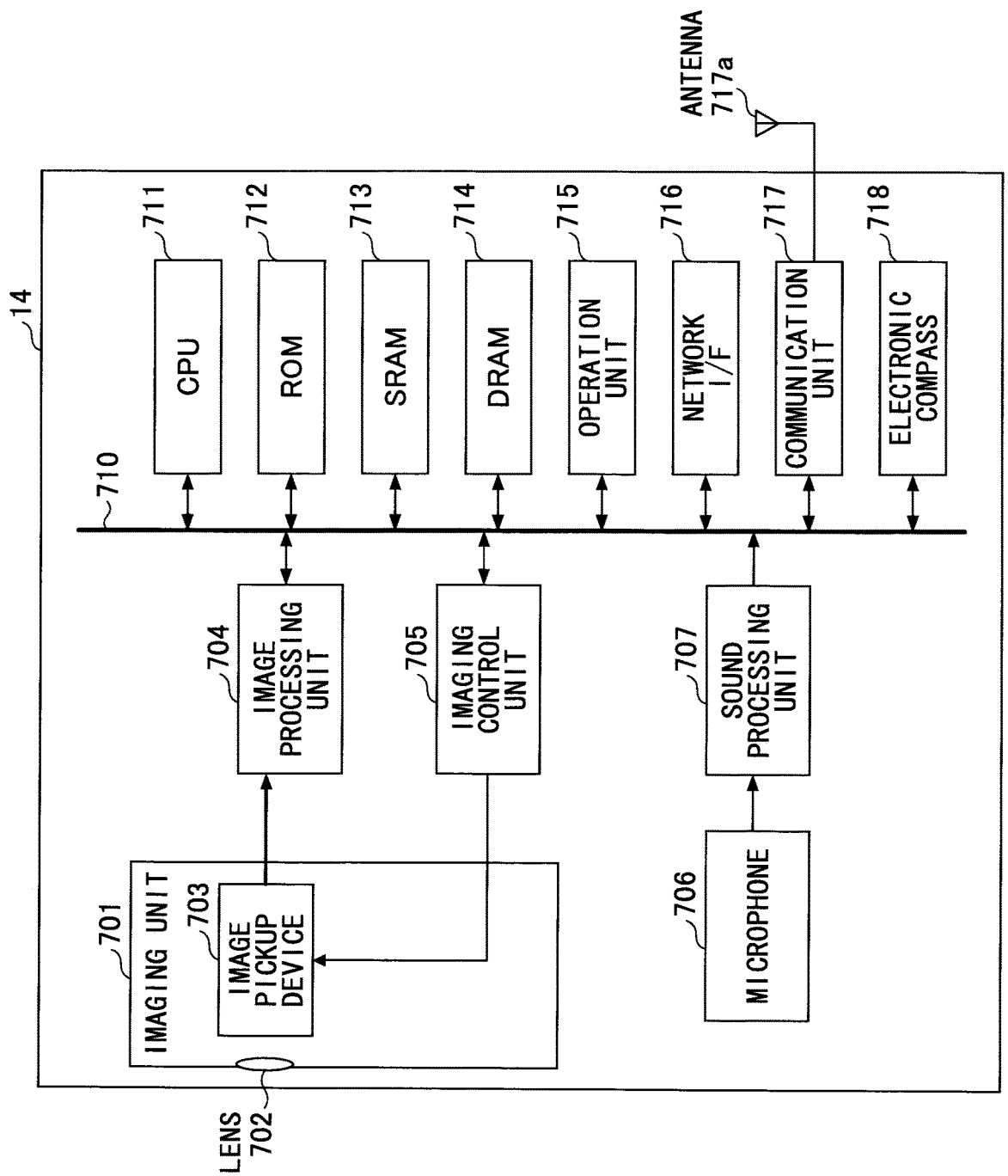

[Fig. 5]
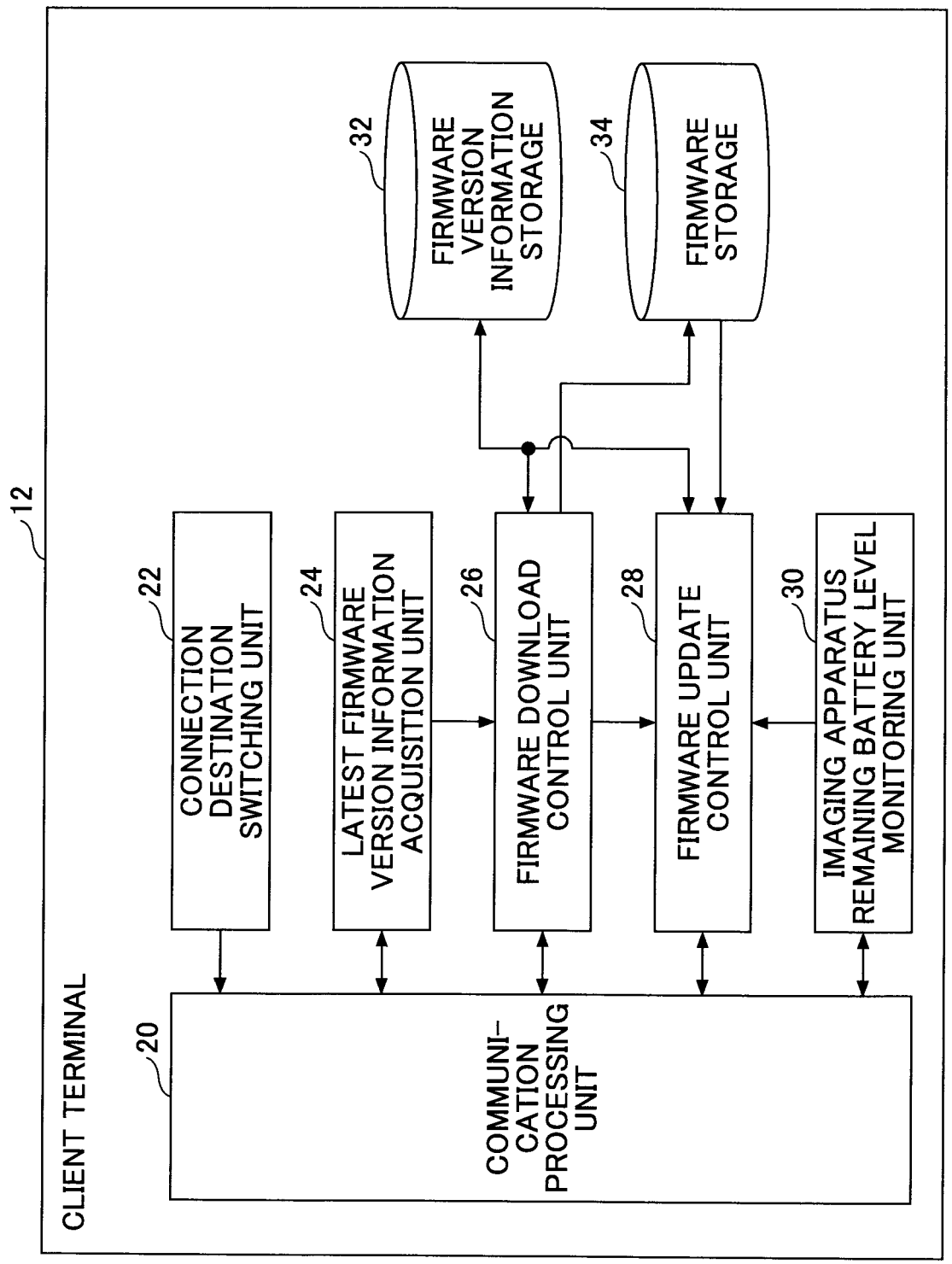

[Fig. 6]
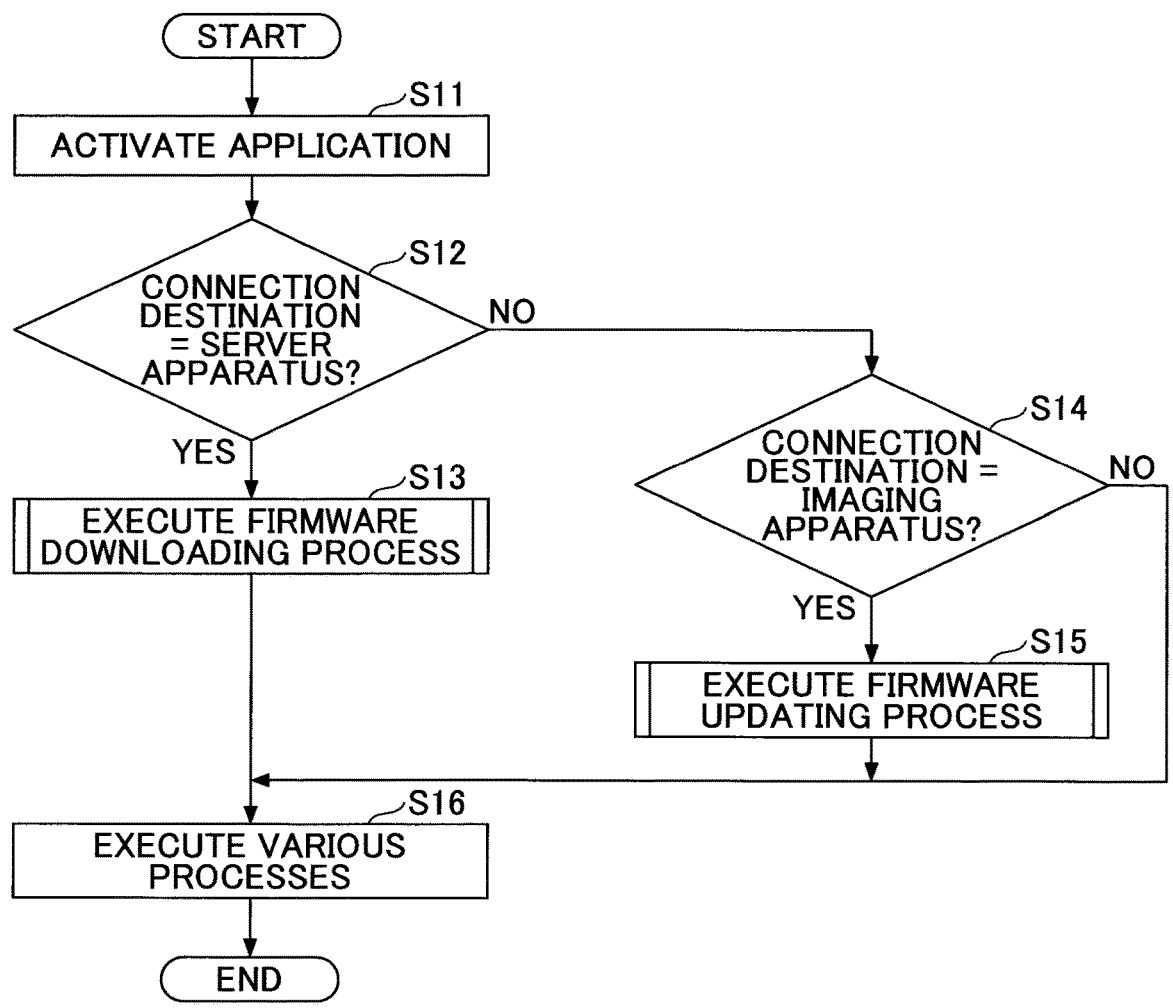

[Fig. 7]
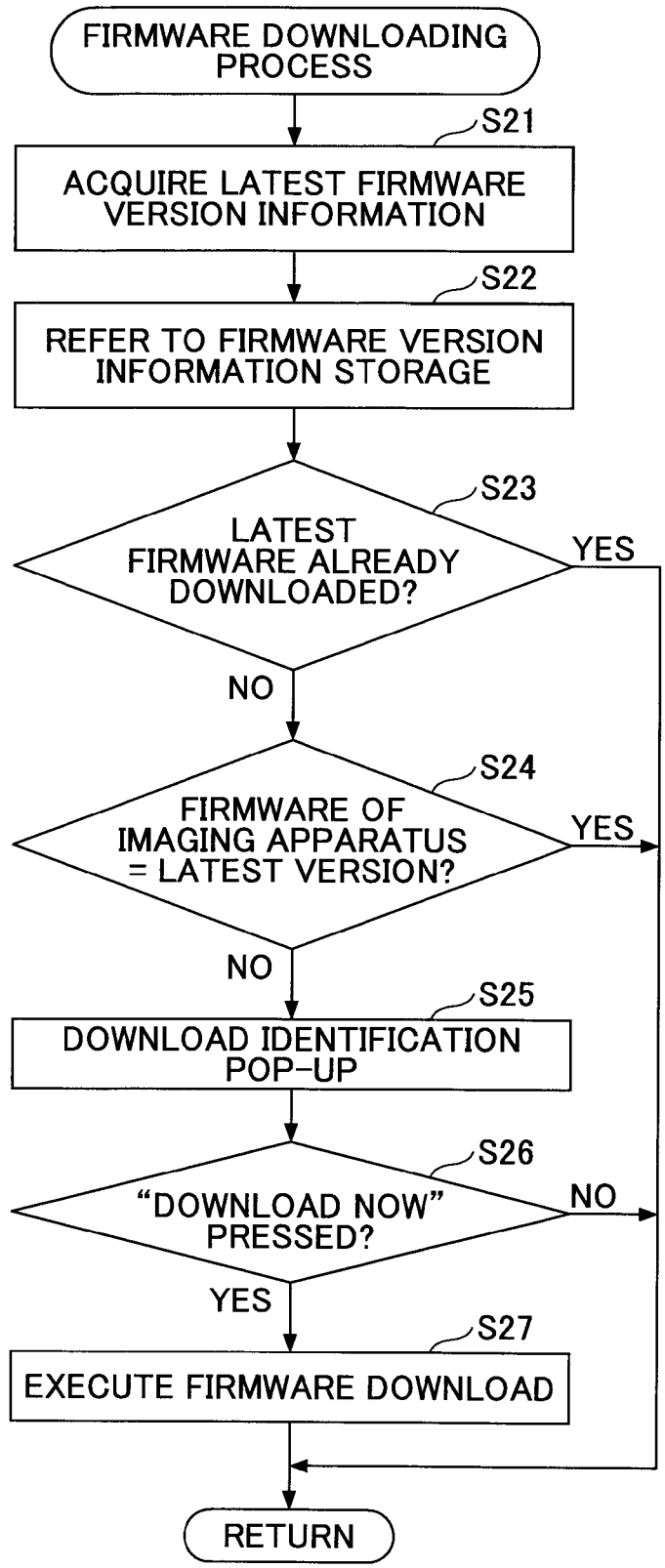

[Fig. 8]

| DOWNLOADED FIRMWARE VERSION | 2.1.1 |
|---|---|
| FIRMWARE VERSION OF MOST RECENTLY CONNECTED IMAGING APPARATUS | 2.1.1 |

[Fig. 9]
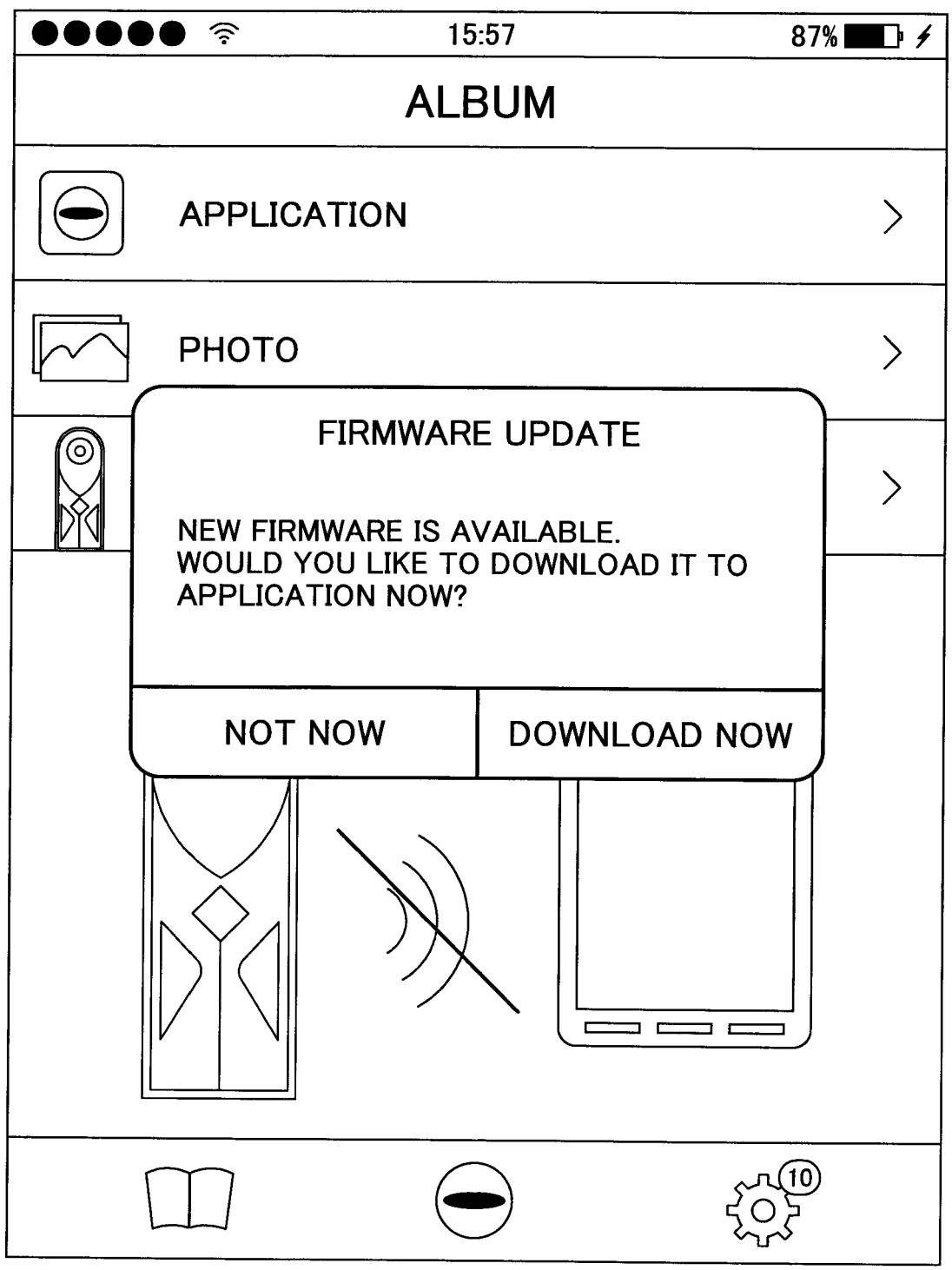

[Fig. 10]
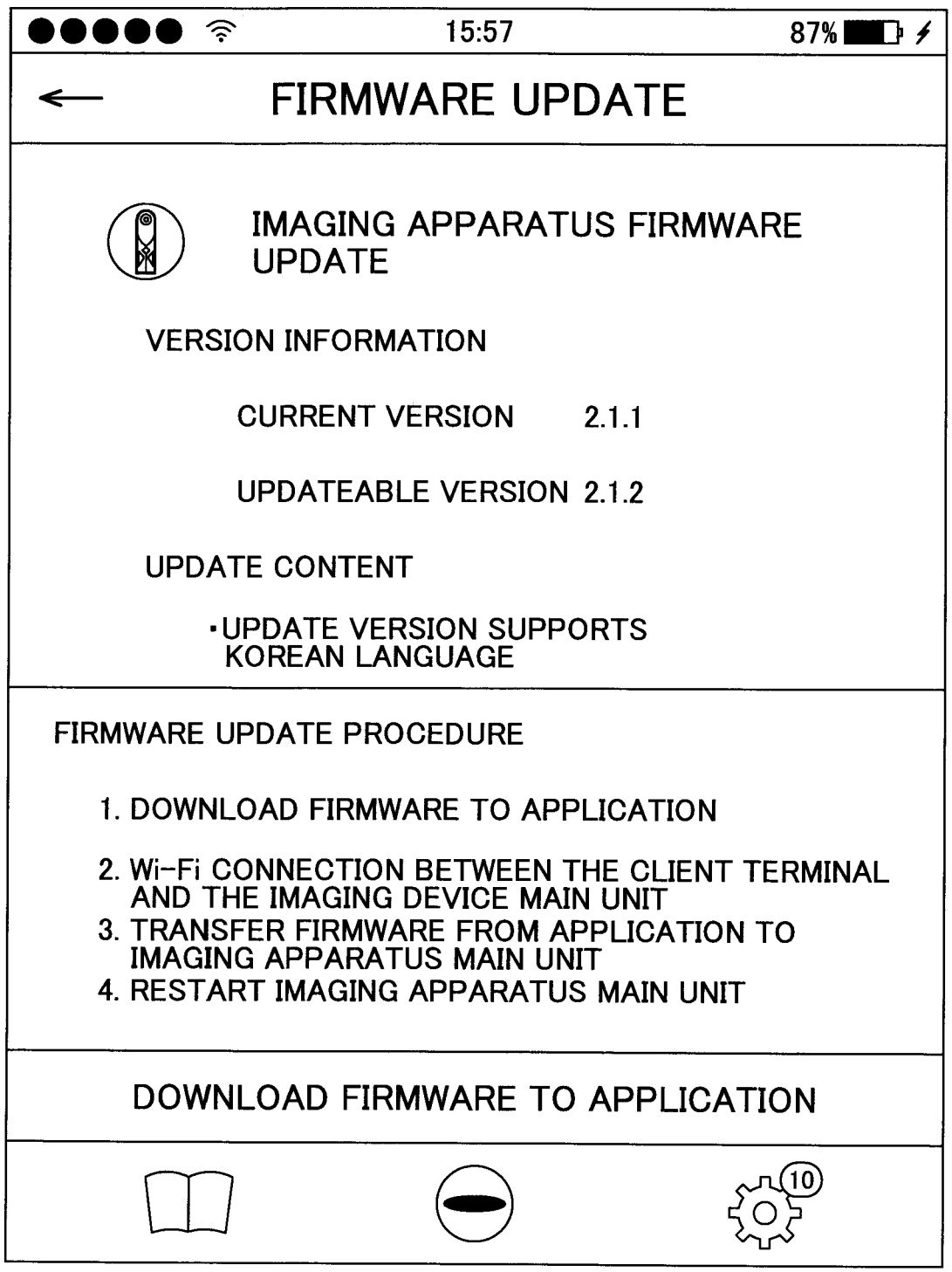

[Fig. 11]
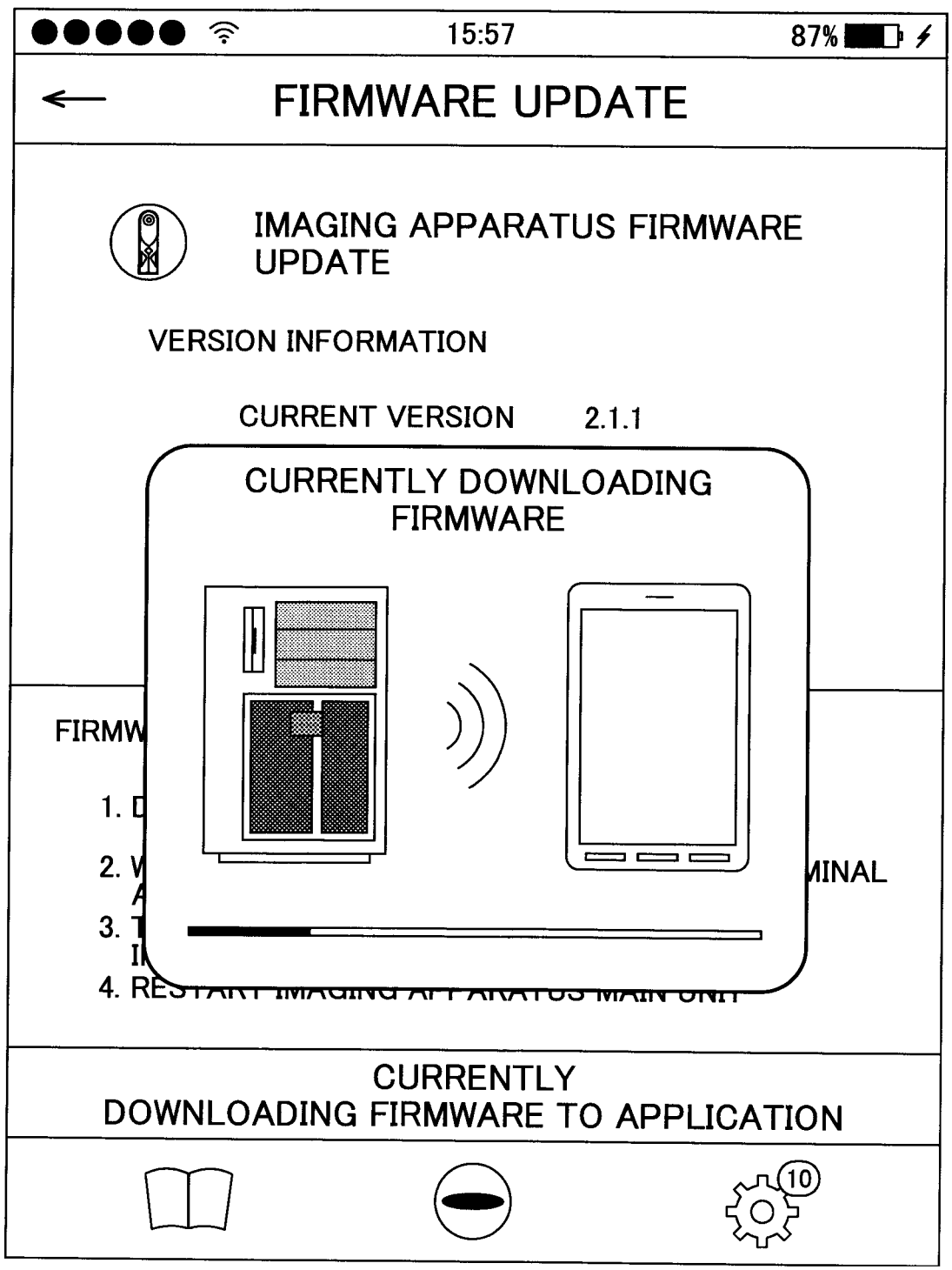

[Fig. 12]
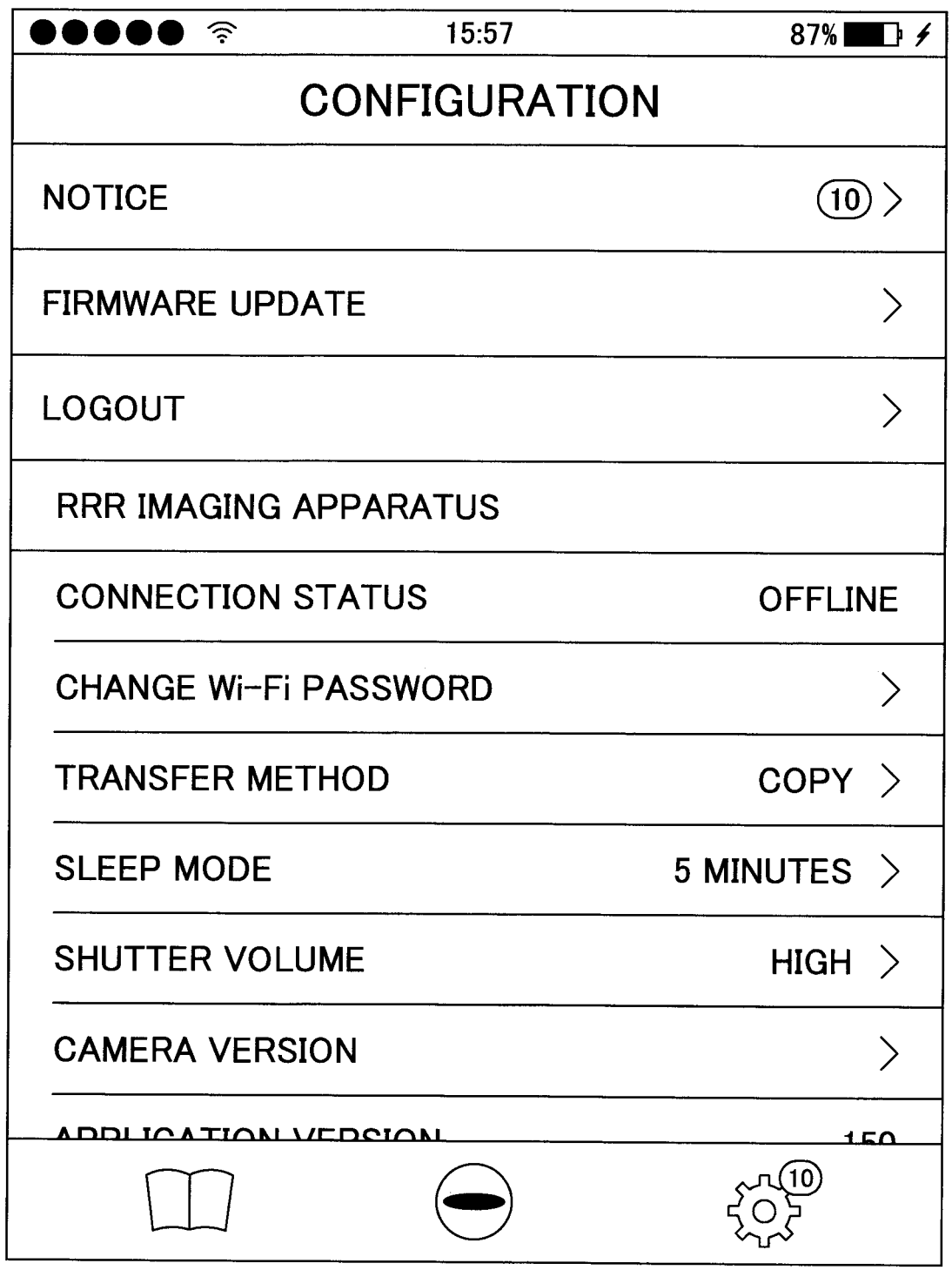

[Fig. 13]
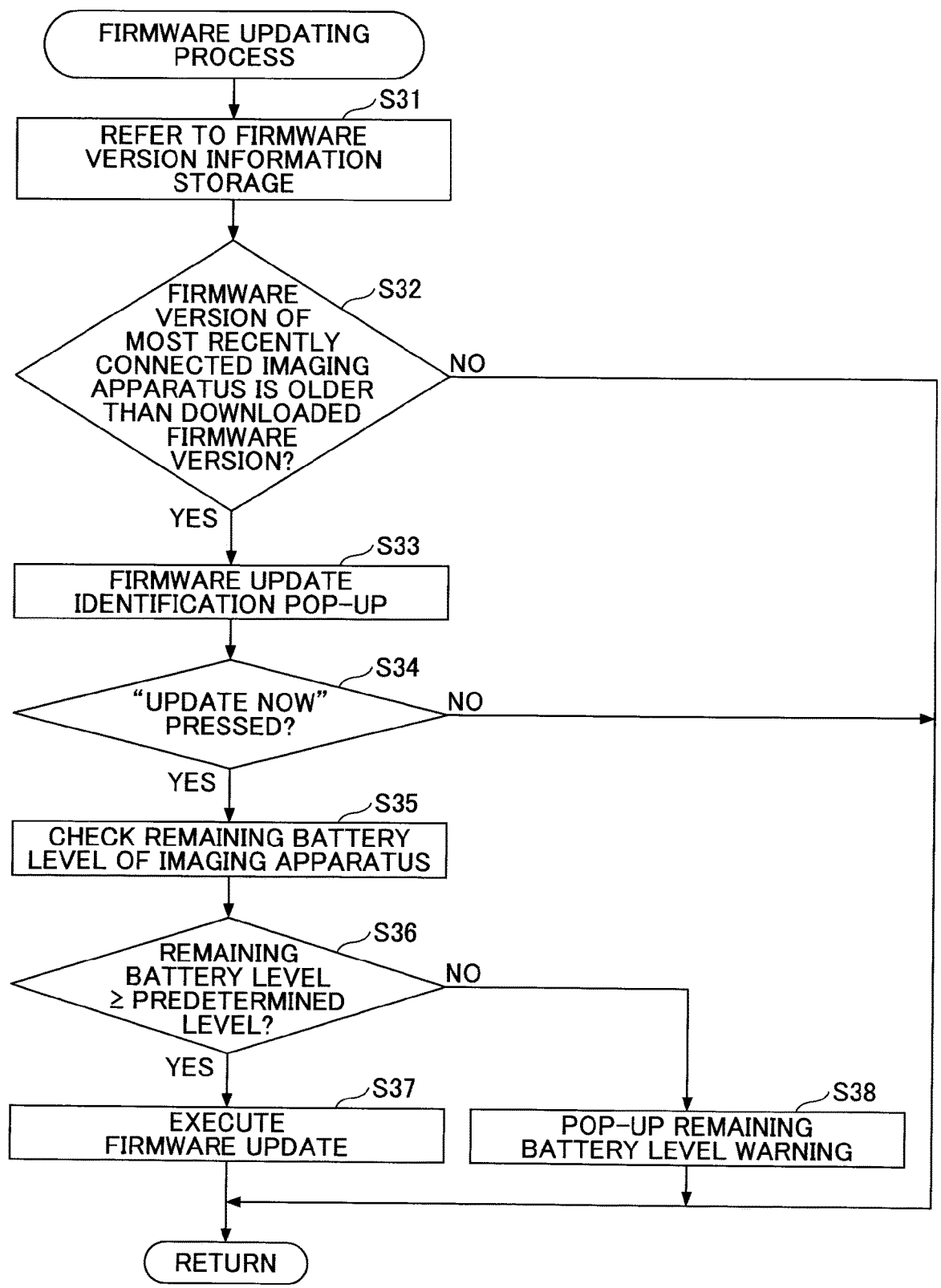

[Fig. 14]
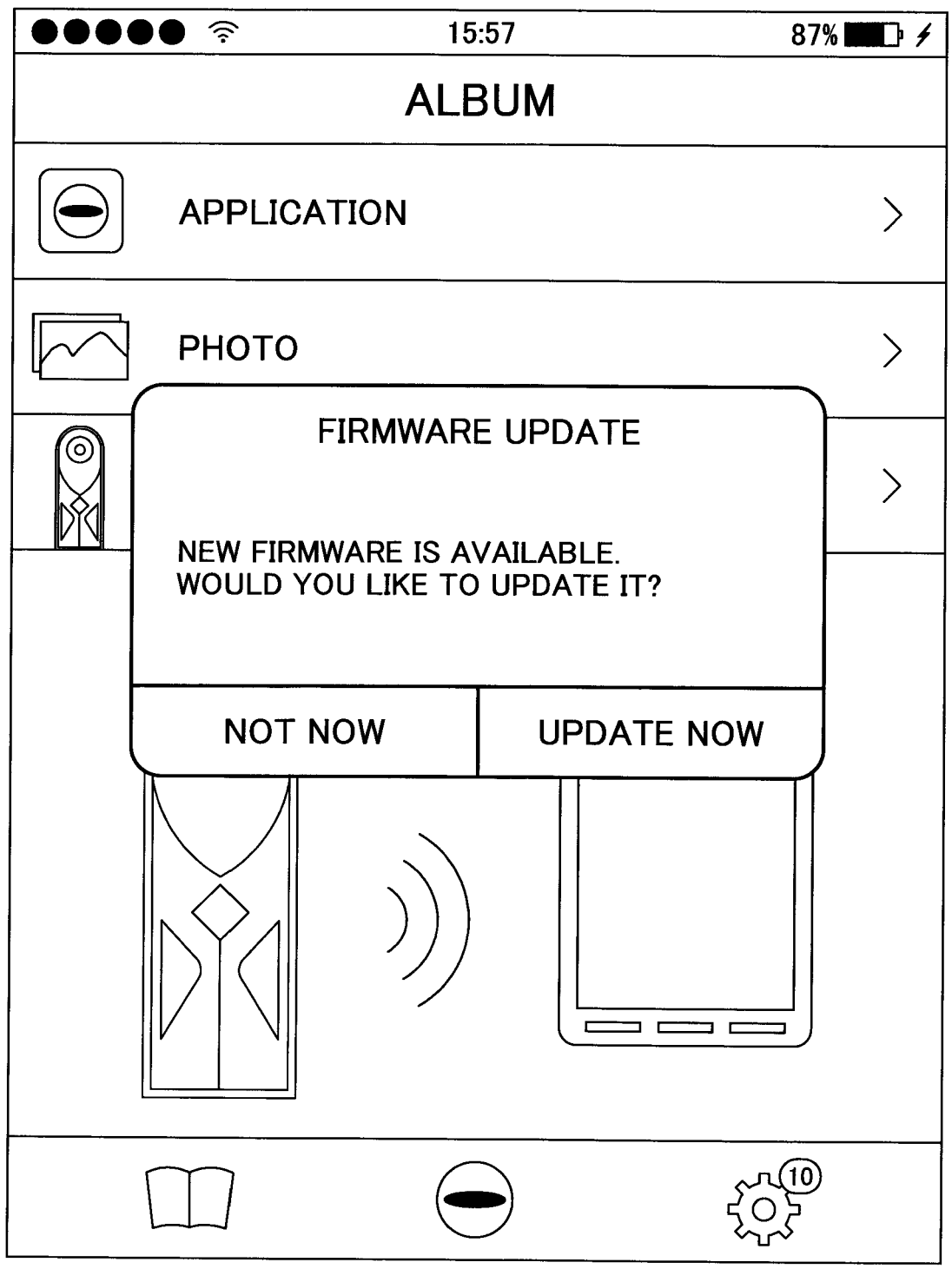

[Fig. 15]
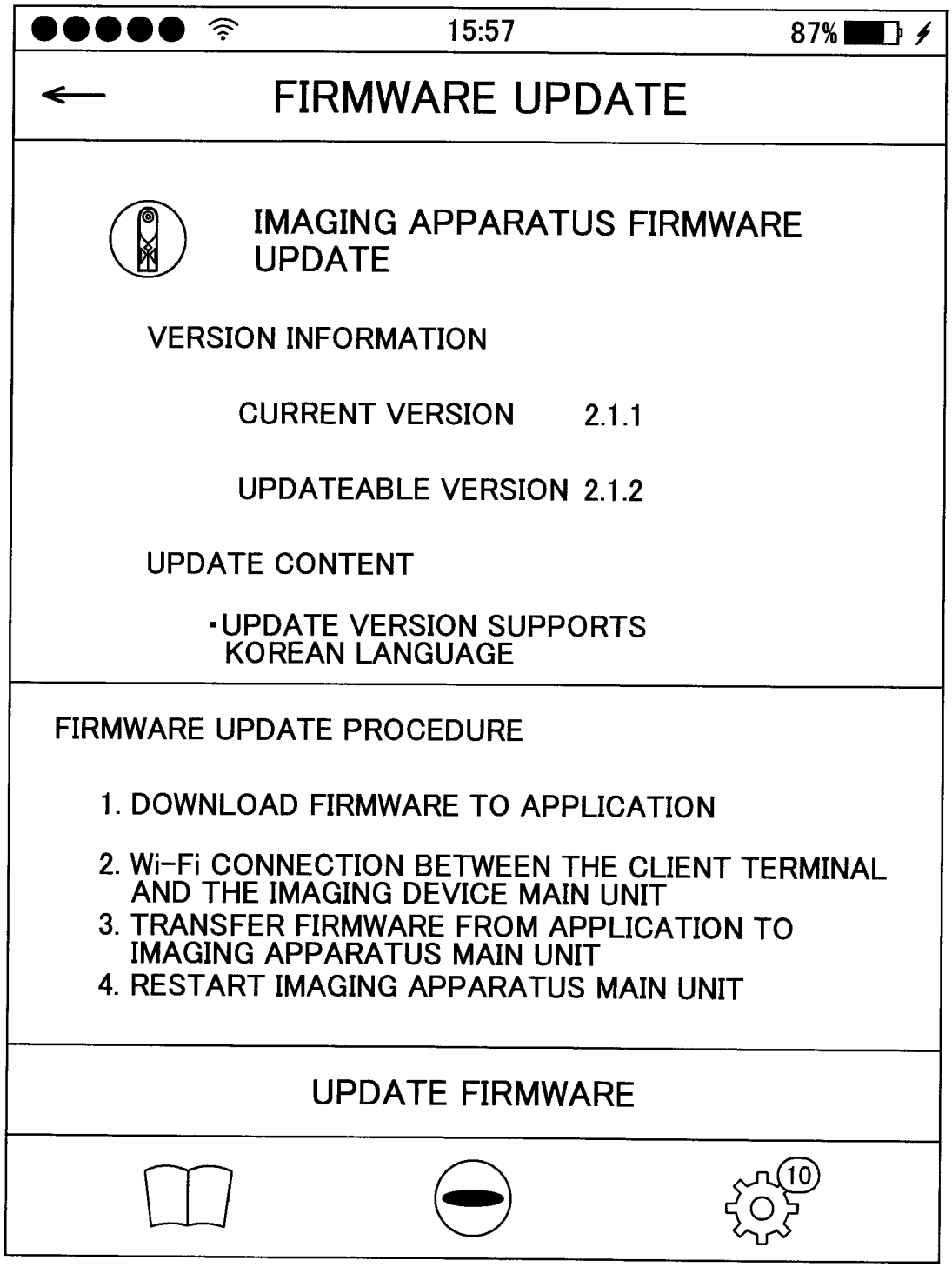

[Fig. 16]
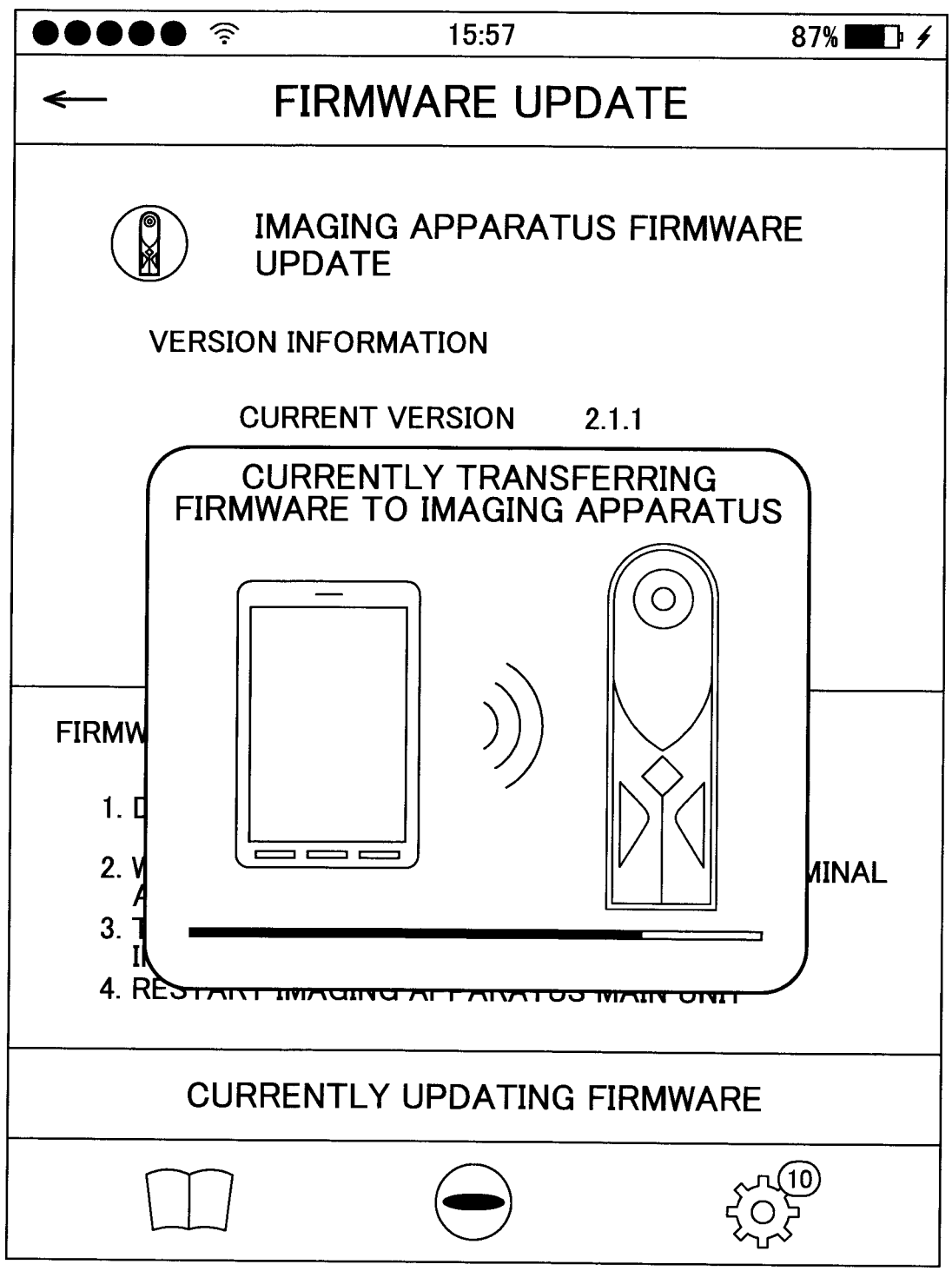

[Fig. 17]
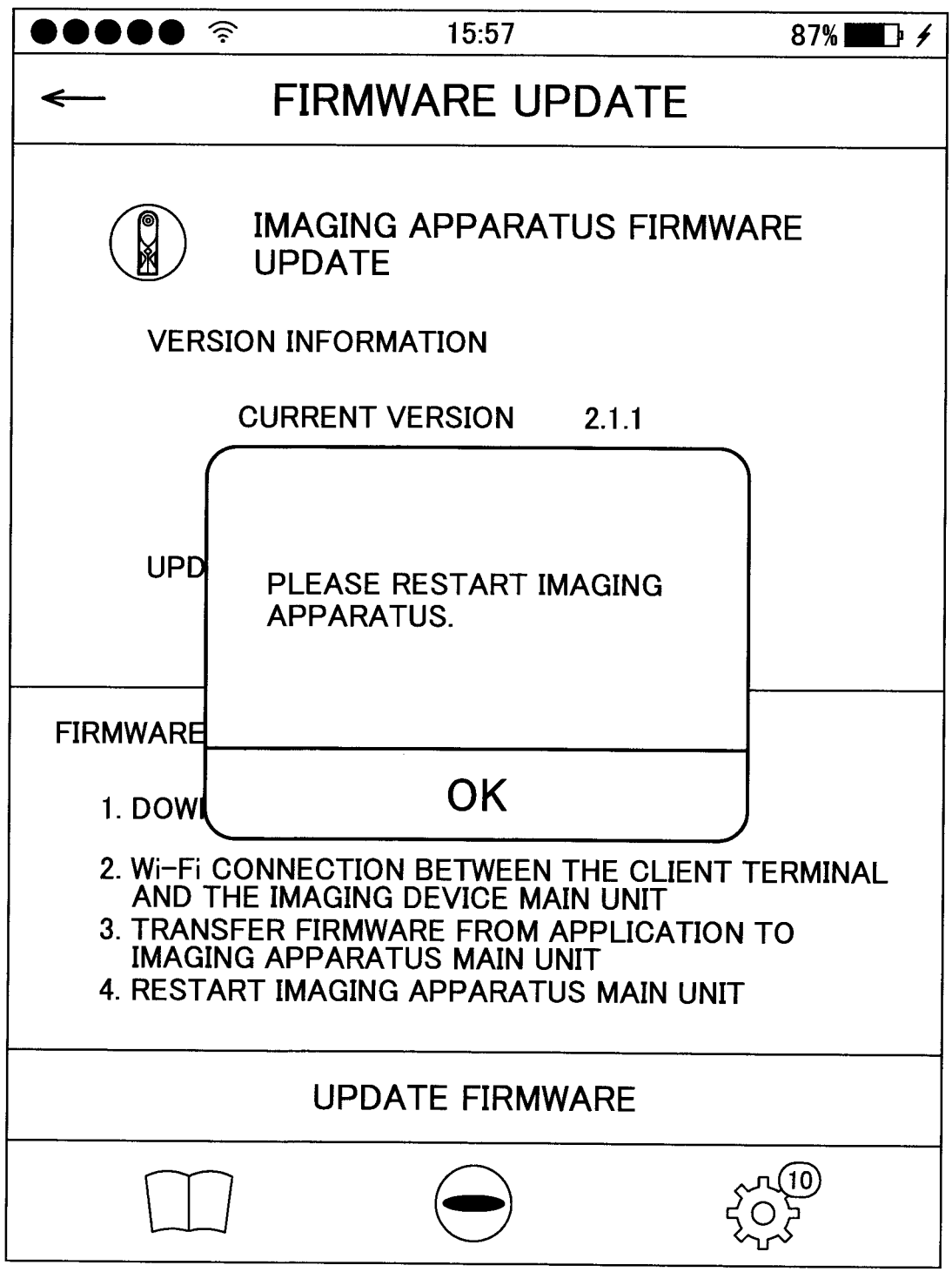

[Fig. 18]
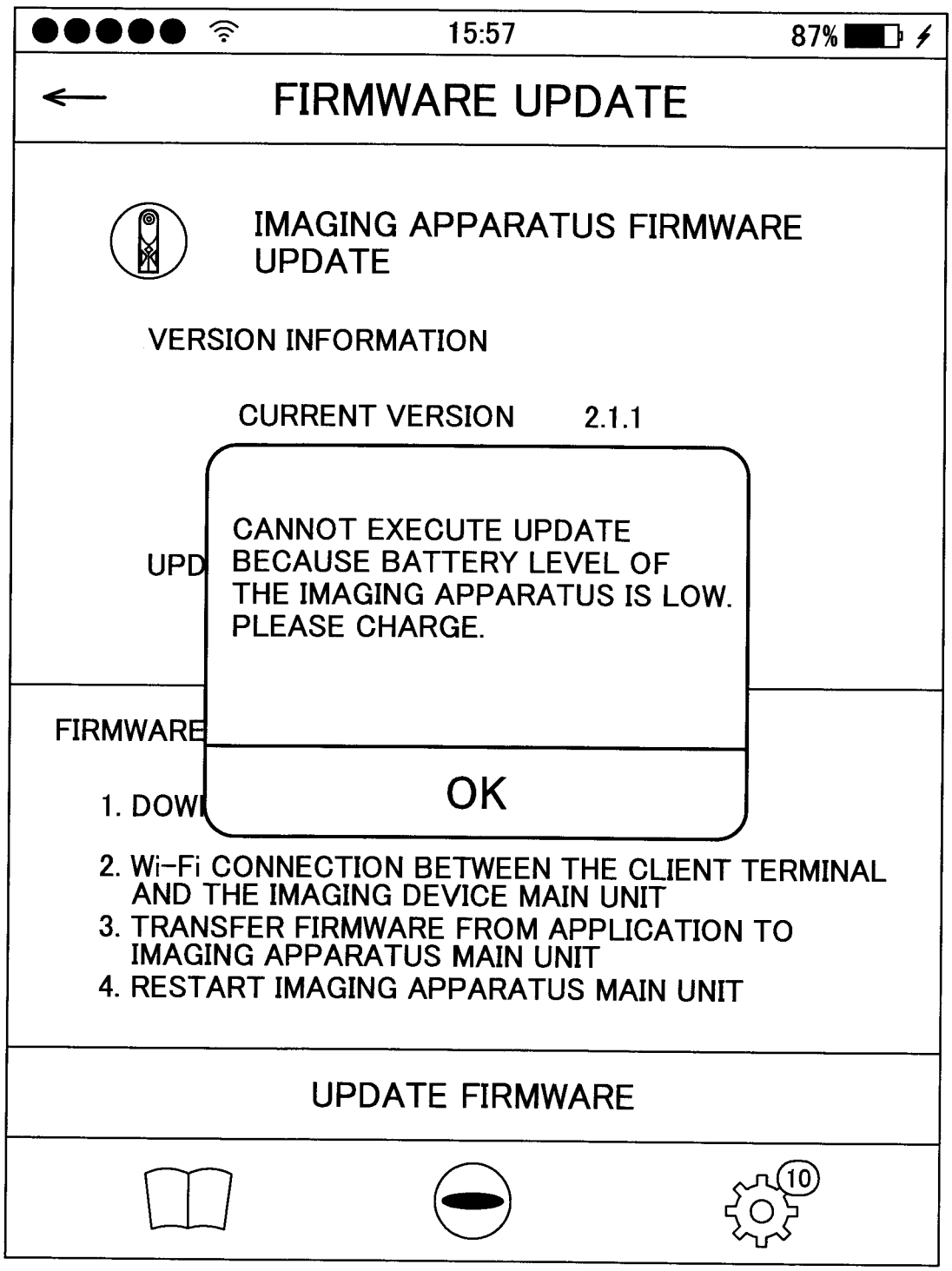

[Fig. 19]
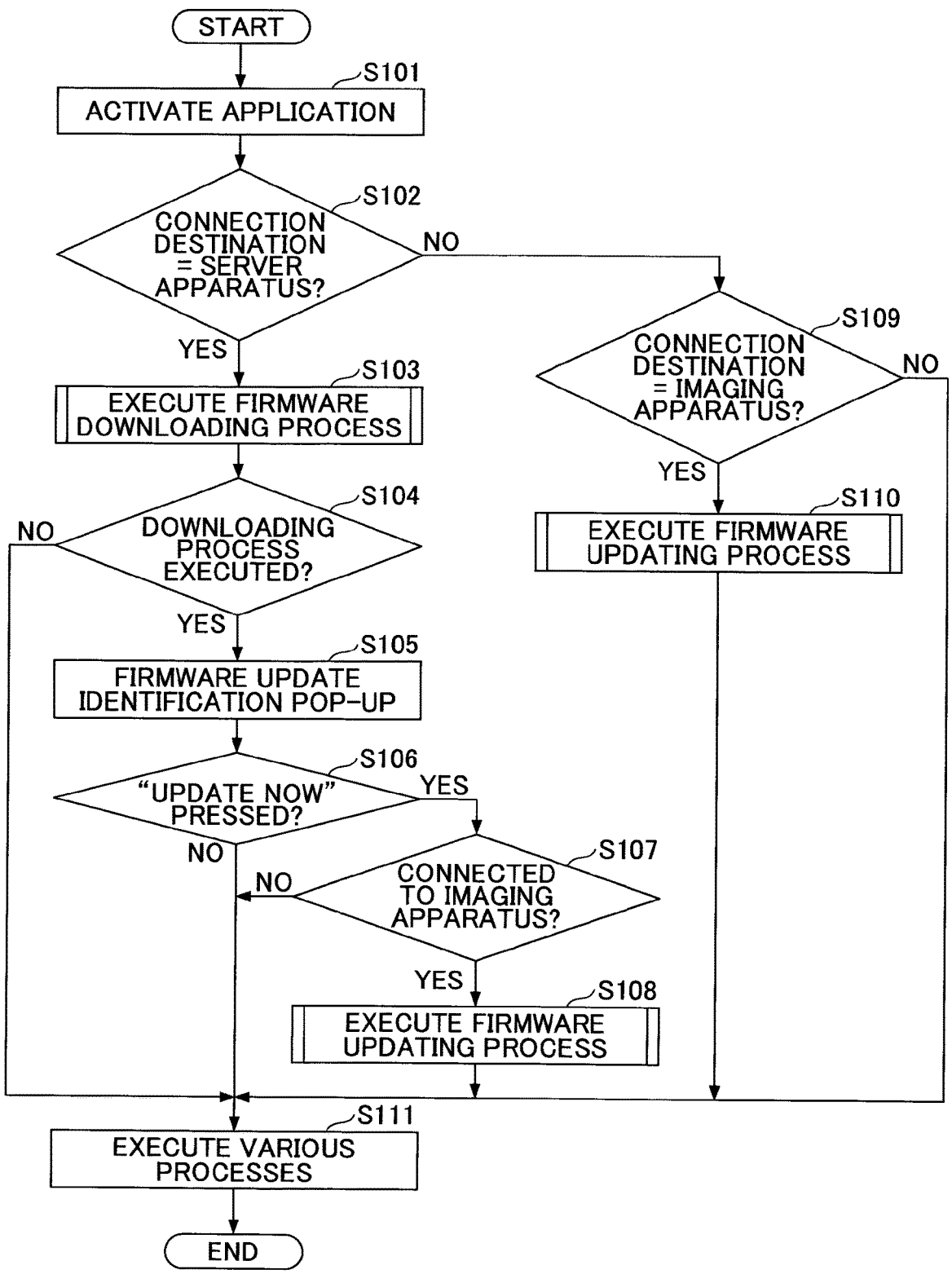

[Fig. 20]
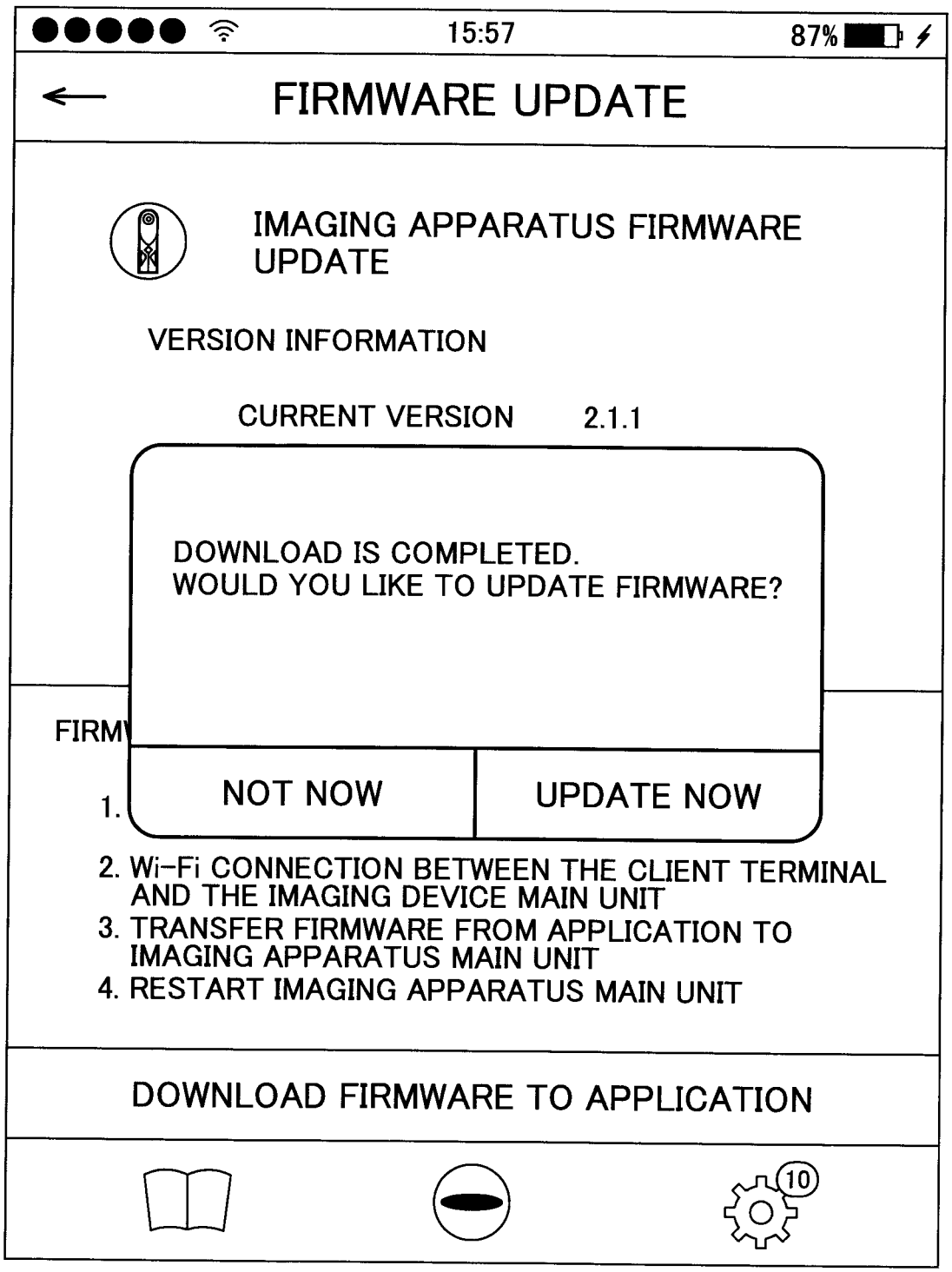

[Fig. 21]
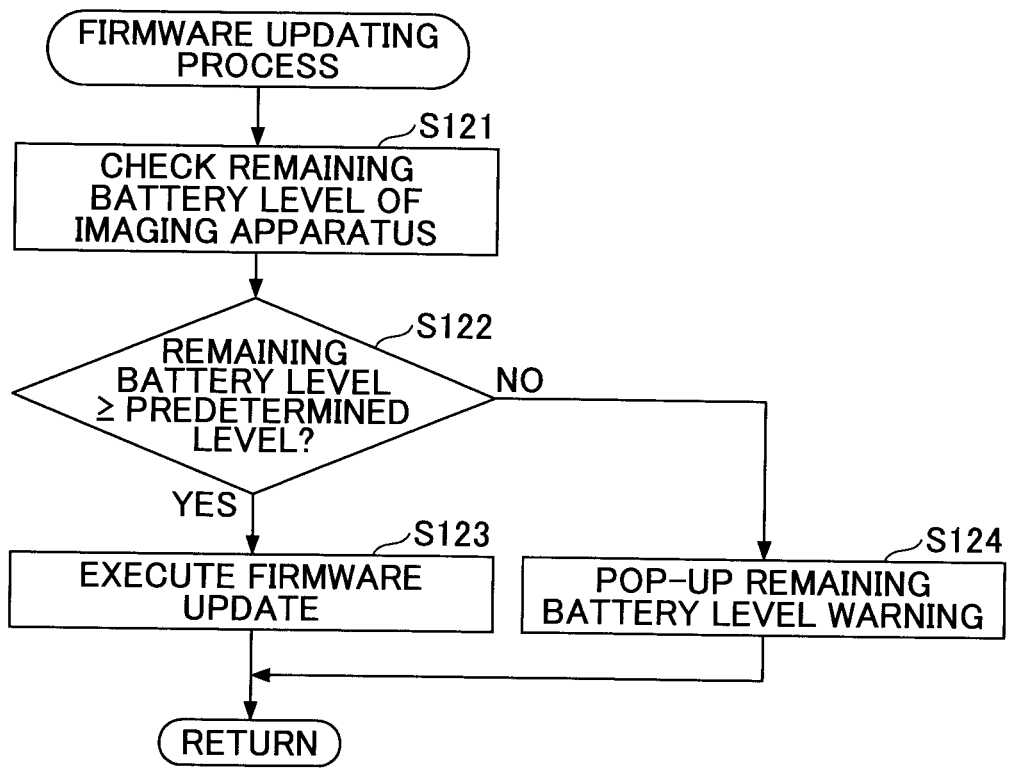

INFORMATION PROCESSING SYSTEM, CLIENT TERMINAL, AND CONTROL METHOD

TECHNICAL FIELD

The present disclosure relates to an information processing system, a client terminal, and a control method.

BACKGROUND ART

Recent electronic apparatuses such as digital cameras are capable of rewriting firmware so as to enable addition of functions and troubleshooting after shipping to the market. Programmable firmware of an electronic apparatus such as a digital camera may be useful in this way.

Related art digital cameras implement rewriting of firmware by using a cradle device connectable to personal computers (PCs) and digital cameras (see, for example, Patent Document 1).

CITATION LIST

Patent Literature

[PTL 1] Japanese Unexamined Patent Application Publication No. 2004-104533

SUMMARY OF INVENTION

Technical Problem

However, since the related art digital cameras are connected to the cradle device only in cases such as a need to transfer image data, they are not designed to be frequently connected to the cradle device. Hence, in the related art digital cameras that rewrite the firmware at the timing of being connected to the cradle device, there is a possibility that the rewriting of the firmware is greatly delayed.

Solution to Problem

An aspect of an embodiment of the present invention is to provide an information processing system capable of quickly updating firmware installed in an electronic apparatus.

In accordance with an aspect of an embodiment, an information processing system includes an electronic apparatus having firmware installed therein; and a client terminal configured to be communicably coupled to the electronic apparatus or to a server configured to provide the firmware through switching between the electronic apparatus and a network to a coupling destination. The client terminal includes a firmware acquisition control unit configured to acquire firmware from the server apparatus to store the acquired firmware in a firmware storage in response to the client terminal being communicably coupled to the server apparatus, and a firmware update control unit configured to update the firmware installed in the electronic apparatus to the firmware stored in the firmware storage in response to the client terminal being communicably coupled to the electronic apparatus.

Advantageous Effect of Invention

According to at least one embodiment of the present invention, it is possible to quickly update the firmware installed in the electronic apparatus.

BRIEF DESCRIPTION OF DRAWINGS

FIG. 1A is a system configuration diagram of an example of an information processing system according to a present embodiment;

FIG. 1B is a system configuration diagram of an example of an information processing system according to the present embodiment;

FIG. 2 is a hardware configuration diagram of an example of a server apparatus according to the present embodiment FIG. 3 is a hardware configuration diagram of an example of a client terminal according to the present embodiment;

FIG. 4 is a hardware configuration diagram of an example of an imaging apparatus according to the present embodiment;

FIG. 5 is a block diagram of an example of a client terminal according to the present embodiment;

FIG. 6 is a flowchart of an example illustrating a process outline with respect to the client terminal according to the present embodiment;

FIG. 7 is a flowchart of an example of a firmware downloading process;

FIG. 8 is a configuration diagram of an example of firmware version information;

FIG. 9 is an image diagram of an example of a download identification pop-up;

FIG. 10 is an image diagram of an example of a firmware update screen;

FIG. 11 is an image diagram of an example of a firmware download in progress pop-up;

FIG. 12 is an image diagram of an example of a setting screen that may transition to a firmware update screen;

FIG. 13 is a flowchart of an example of a firmware downloading process;

FIG. 14 is an image diagram of an example of a pop-up of update identification;

FIG. 15 is an image diagram of an example of a firmware update screen;

FIG. 16 is an image diagram of an example of a firmware transfer in progress pop-up;

FIG. 17 is an image diagram of an example of a pop-up prompting restart of the imaging apparatus;

FIG. 18 is an image diagram of an example of an imaging apparatus remaining battery level warning pop-up;

FIG. 19 is a flowchart of an example illustrating a process outline with respect to the client terminal according to the present embodiment;

FIG. 20 is an image diagram of an example of an update identification pop-up displayed after downloading is completed; and FIG. 21 is a flowchart of an example of a firmware updating process.

DESCRIPTION OF EMBODIMENTS

Example 1

First Embodiment

System Configuration

The following illustrates details of an embodiment of the present invention. FIGS. 1A and 1B are a system configuration diagram of an example of an information processing system according to an embodiment of the present invention. As illustrated in FIGS. 1A and 1B, an information processing system 1 according to the present embodiment includes a server apparatus 10, a client terminal 12, and an imaging apparatus 14. The server apparatus 10 and the client terminal 12 are coupled via a network 16 such as a wireless LAN. The imaging apparatus 14 and the client terminal 12 are coupled via a network 18 such as a wireless LAN. The client terminal 12 is coupled to the server apparatus 10 or the imaging apparatus 14 by switching between the network 16 or 18 acting as a coupling destination.

FIG. 1A illustrates a state in which the client terminal 12 switches the coupling destination to the network 16 such that the client terminal 12 is coupled to the server apparatus 10. FIG. 1B illustrates a state in which the client terminal 12 switches the coupling destination to the network 18 such that the client terminal 12 is coupled to the imaging apparatus 14. For example, FIG. 1B illustrates an example of a communication system that allows the client terminal 12 and the imaging apparatus 14 to directly communicate with each other on a one-to-one basis, such as Wi-Fi Direct (registered trademark).

The server apparatus 10 manages firmware for the imaging apparatus 14. The server apparatus 10 provides firmware information to the client terminal 12, based on a request from the client terminal 12. Additionally, the server apparatus 10 enables firmware information to be downloaded by the client terminal 12, based on a request from the client terminal 12. Note that the server apparatus 10 of the information processing system 1 of FIGS. 1A and 1B is an example and may be configured to be distributed among multiple computers.

The client terminal 12 is an example of a mobile terminal such as a smart device, a tablet terminal, a mobile phone, a notebook PC, etc., which a user operates. The client terminal 12 has an application for the imaging apparatus 14 (hereinafter referred to as an "application") installed. When the user uses the imaging apparatus 14, the client terminal 12 is connectable to the imaging apparatus 14 via the network 18. The application of the client terminal 12 coupled to the imaging apparatus 14 displays a view taken by the imaging apparatus 14 and receives an operation from the user to the imaging apparatus 14. Thus, the imaging apparatus 14 may be expected to be coupled to the client terminal 12 for using the imaging apparatus 14 in addition to a case where the imaged data needs to be transferred, such as when causing the imaging apparatus 14 to perform imaging.

The imaging apparatus 14 is an example of an electronic apparatus having firmware installed therein. Electronic apparatuses in which firmware is installed include various apparatuses such as digital cameras, digital video camcorders, digital measuring instruments, and the like. Any electronic apparatus that updates the installed firmware may be the electronic apparatus according to the present embodiment. The imaging apparatus 14 may transmit captured data to the client terminal 12 to display or store the transmitted data.

Hardware Configuration

Server Apparatus

The server apparatus 10 is implemented by, for example, a hardware configuration illustrated in FIG. 2. FIG. 2 is a hardware configuration diagram of an example of a server apparatus according to the present embodiment.

The server apparatus 10 in FIG. 2 includes an input apparatus 501, a display apparatus 502, an external I/F 503, a RAM 504, a ROM 505, a CPU 506, a communication I/F 507, an HDD 508, and the like, which are mutually coupled via a bus B. Note that the input apparatus 501 and the display apparatus 502 may optionally be coupled and used as required.

The input apparatus 501 includes a keyboard, a mouse, a touch panel, and the like, and is used by a user to input each operation signal. The display apparatus 502 includes a display and the like, and displays the process result of the server apparatus 10.

The communication I/F 507 is an interface configured to couple the server apparatus 10 to various networks. As a result, the server apparatus 10 is enabled to perform data communication via the communication I/F 507.

The HDD 508 is an example of a nonvolatile storage device that stores programs and data. Programs and data to be stored in the HDD 508 include an OS acting as basic software for controlling the entire server apparatus 10, a program that provides various functions on the OS, and the like. Instead of the HDD 508, the server apparatus 10 may use a drive device (e.g., solid state drive: SSD) using a flash memory as a storage medium.

The external I/F 503 is an interface with an external apparatus. The external apparatus includes a recording medium 503a and the like. Accordingly, the server apparatus 10 is enabled to read and/or write to the recording medium 503a via the external I/F 503. Examples of the recording medium 503a include a flexible disk, a CD, a DVD, an SD memory card, a USB memory, and the like.

The ROM 505 is an example of a nonvolatile semiconductor memory (storage device) that may store programs and data even when the power is turned off. The ROM 505 stores programs and data such as a BIOS, an OS setting, and a network setting, which are executed when the server apparatus 10 is activated. The RAM 504 is an example of a volatile semiconductor memory (storage device) that temporarily stores programs and data.

The CPU 506 is a processor device that implements control and functions of the entire server apparatus 10 by loading programs and data from a storage device such as the ROM 505 and the HDD 508 onto the RAM 504 to execute a process. The server apparatus 10 is implemented by, for example, a hardware configuration illustrated in FIG. 2.

Client Terminal

The client terminal 12 is implemented by, for example, a hardware configuration illustrated in FIG. 3. FIG. 3 is a hardware configuration diagram of an example of a client terminal according to an embodiment. The client terminal 12 in FIG. 3 includes, for example, a CPU 601, a ROM 602, a RAM 603, an EEPROM 604, a CMOS sensor 605, an acceleration-direction sensor 606, and a media drive 608.

The CPU 601 controls operations of the entire client terminal 12. The ROM 602 stores a basic input/output program. The RAM 603 is used as a work area of the CPU 601. The EEPROM 604 performs reading or writing of data in accordance with control from the CPU 601. The CMOS sensor 605 captures an image of an object to acquire image data in accordance with control from the CPU 601. The acceleration-direction sensor 606 is an electronic magnetic compass such as a gyro compass, an acceleration sensor, or the like, and is configured to detect geomagnetism.

The media drive 608 controls reading or writing (storage) of data with respect to a recording medium 607 such as a flash memory. The media drive 608 has a configuration in which a recording medium 607, from which data previously recorded is read or to which newly written data is stored, is detachably attached.

Note that the EEPROM 604 stores an OS executed by the CPU 601, association information necessary for network setting, and the like. An application for executing various processes in the embodiment of the present invention is stored in the EEPROM 604, the recording medium 607, or the like.

In addition, the CMOS sensor 605 is a charge coupled device that converts light into electric charge so as to convert the image of the subject in an electronically available form. The CMOS sensor 605 may be, for example, a CCD (Charge Coupled Device) sensor insofar as the CCD is enabled to image a subject.

Furthermore, the client terminal 12 includes an audio input unit 609, an audio output unit 610, an antenna 611, a communication unit 612, a wireless LAN communication unit 613, a near field communication antenna 614, a near field communication unit 615, a display 616, a touch panel 617, and a bus line 619.

The audio input unit 609 converts voice or sound into an audio signal. The audio output unit 610 converts an audio signal into voice or sound. The communication unit 612 communicates with a nearest base station device by radio communication signal using the antenna 611. The wireless LAN communication unit 613 performs wireless LAN communication in compliance with the IEEE80411 standard or the like. The near field communication unit 615 performs near-field wireless communication using the near field communication antenna 614.

The display 616 is a liquid crystal, an organic EL, or the like, and is configured to display an image of a subject and various icons and the like. The touch panel 617 is placed on the display 616 and is formed with a pressure-sensitive panel or electrostatic panel, and detects a touch position on the display 616 by a touch with a finger, a touch pen or the like. The bus line 619 is an address bus, a data bus, or the like, and is configured to electrically couple the above-described units.

In addition, the client terminal 12 has a dedicated battery 618. The client terminal 12 is driven by the battery 618. Note that the audio input unit 609 includes a microphone configured to input voice or sound. The audio output unit 610 includes a speaker configured to output voice or sound. The client terminal 12 is enabled to implement later-described various processes with the hardware configuration illustrated in FIG. 4, for example.

Imaging Apparatus

The imaging apparatus 14 is implemented by, for example, a hardware configuration illustrated in FIG. 4. FIG. 4 is a hardware configuration diagram of an example of an imaging apparatus according to an embodiment. The imaging apparatus 14 includes an imaging unit 701, an image processing unit 704, an imaging control unit 705, a microphone 706, a sound processing unit 707, a CPU 711, a ROM 712, an SRAM 713, a DRAM 714, an operation unit 715, a network I/F 716, a communication unit 717, an antenna 117a, and an electronic compass 718.

The imaging unit 701 includes a lens 702 and an image pickup device 703 disposed corresponding to the lens 702. The image pickup device 703 includes an image sensor such as a CMOS sensor or a CCD sensor configured to convert an optical image by the lens 702 into image data of an electrical signal and output the converted image data. The image pickup device 703 further includes a timing generation circuit configured to generate a horizontal or vertical synchronizing signal of the image sensor, a pixel clock and the like, a group of registers (hereinafter also referred to as a "register group") in which various commands and parameters necessary for the operation are set, and the like.

The image pickup device 703 of the imaging unit 701 is coupled to the image processing unit 704 via a parallel I/F bus. The image pickup device 703 of the imaging unit 701 is coupled to the imaging control unit 705 via a serial I/F bus (I2C bus or the like). The image processing unit 704 and the imaging control unit 705 are coupled to the CPU 711 via a bus 710. The bus 710 is also coupled to a ROM 712, an SRAM 713, a DRAM 714, an operation unit 715, a network I/F 716, a communication unit 717, an electronic compass 718, and the like.

The image processing unit 704 acquires the image data output from the image pickup device 703 through the parallel I/F bus, and performs a predetermined process on each image data. In addition, the imaging control unit 705 sets commands and the like in the register group of the imaging device 703 by using the I2C bus. The imaging control unit 705 acquires required commands and the like that are received from the CPU 711. Further, the imaging control unit 705 likewise uses the I2C bus to incorporate status data and the like of the register group of the image pickup device 703, and send the incorporated data to the CPU 711.

Further, the imaging control unit 705 instructs the image pickup device 703 to output image data at the timing when a shutter button of the operation unit 715 is pressed. The microphone 706 converts the sound into an audio (signal) data. The sound processing unit 707 captures the sound data output from the microphone 706 through the I/F bus, and performs a predetermined process on the audio data.

The CPU 711 controls overall operations of the imaging apparatus 14. The ROM 712 stores various programs for the CPU 711. The SRAM 713 and the DRAM 714 are work memories, and each configured to store programs executed by the CPU 711, data under processing, and the like. Specifically, the DRAM 714 stores image data to be processed under processing in the image processing unit 704 and the processed image data.

The operation unit 715 is a generic name for various operation buttons, a power switch, a shutter button, a touch panel that combines functions of display and operation, and the like. The user inputs various imaging modes and imaging conditions by operating the operation buttons.

The network I/F 716 is a generic name for an interface circuit (USB I/F, etc.) with an external medium such as an SD card, a PC or the like. The communication unit 717 communicates by wireless LAN communication or near field communication technology via the antenna 717a disposed in the imaging apparatus 14. The electronic compass 718 calculates directions and inclination of the imaging apparatus 14 from the magnetism of the earth, and outputs direction-inclination information.

Software Configuration

The following describes process blocks of the client terminal 12. Process blocks of the server apparatus 10 and the imaging apparatus 14 are similar to those of existing process blocks, and therefore the description thereof is omitted.

The client terminal 12 according to the present embodiment is implemented by process blocks as illustrated in FIG. 5, for example. FIG. 5 is a block diagram of an example of a client terminal according to an embodiment. The client terminal 12 executes programs such as applications for the imaging apparatus 14 (hereinafter called an "imaging apparatus application") to implement a communication processing unit 20, a coupling destination switching unit 22, a latest firmware version information acquisition unit 24, a firmware download control unit 26, a firmware update control unit 28, an imaging apparatus battery remaining level monitoring unit 30, a firmware version information storage 32, and a firmware storage 34.

The communication processing unit 20 communicates with the server apparatus 10 or the imaging apparatus 14 via the coupling destination network 16 or 18. The coupling destination switching unit 22 switches the coupling destination network 16 or 18 by a user operation. Note that the coupling destination switching unit 22 may automatically switch the coupling destination insofar as the coupling destination switching unit 22 is enabled to switch the coupling destination network 16 or 18 according to an instruction from the imaging apparatus 14 application.

The latest firmware version information acquisition unit 24 acquires version information of the latest firmware from the server apparatus 10 and reports version information of the latest firmware to the firmware download control unit 26. The firmware download control unit 26 determines whether to download the firmware based on the reported latest firmware version information and on the firmware version information, to be described later, stored in the firmware version information storage 32. The determination of whether firmware needs to be downloaded will be described later. When downloading the firmware from the server apparatus 10, the firmware download control unit 26 stores the downloaded firmware in the firmware storage 34.

The firmware update control unit 28 determines whether firmware needs to be updated based on later-described firmware version information stored in the firmware version information storage 32. Note that the determination of whether firmware needs to be updated will be described later. When the firmware update control unit 28 determines to update the firmware, the firmware update control unit 28 executes the update of the firmware installed in the imaging apparatus 14 by using the firmware stored in the firmware storage 34.

The imaging apparatus battery remaining level monitoring unit 30 monitors the remaining battery level of the imaging apparatus 14. The imaging apparatus battery remaining level monitoring unit 30 reports the remaining battery level of the imaging apparatus 14 to the firmware update control unit 28. The firmware version information storage 32 stores later-described firmware version information. Further, the firmware storage 34 stores the firmware downloaded from the server apparatus 10.

Details of Process

The following describes details of the process of the information processing system 1 according to the present embodiment.

Process Outline in Client Terminal

The client terminal 12 according to the present embodiment performs a firmware downloading process and a firmware updating process according to a procedure as illustrated in FIG. 6, for example. FIG. 6 is a flowchart of an example illustrating a process outline with respect to the client terminal according to the present embodiment. In step S11, the client terminal 12 activates the imaging apparatus 14 application, for example, by receiving a user operation.

In step S12, the client terminal 12 determines whether the client terminal 12 is communicably coupled to the server apparatus 10. When the client terminal 12 is communicably coupled to the server apparatus 10, the client terminal 12 performs the firmware downloading process in step S13. Details of the firmware downloading process in step S13 will be described later.

When the client terminal 12 is not communicably coupled to the server apparatus 10, the client terminal 12 determines whether the client terminal 12 is communicably coupled to the imaging apparatus 14. When the client terminal 12 is communicably coupled to the imaging apparatus 14, the client terminal 12 performs the firmware updating process in step S15. Details of the firmware updating process in step S15 will be described later.

When the client terminal 12 is not communicably coupled to the imaging apparatus 14, the client terminal 12 performs various processes in step S16. The various processes in step S16 are processes other than the firmware downloading process and the firmware updating process executed by the imaging apparatus 14 application in the client terminal 12. Further, the client terminal 12 performs various processes in step S16 after the execution of the firmware downloading process in step S13 and the firmware updating process in step S15. Note that the process of the flowchart of FIG. 6 may be performed every predetermined time (e.g., one hour) in addition to when the application is activated.

As illustrated in the flow chart of FIG. 6, when the imaging apparatus 14 application is started, the client terminal 12 performs a process in accordance with the coupling destination depending on whether the coupling destination is the network 16 or the network 18. Specifically, the client terminal 12 performs a firmware downloading process with the server apparatus 10, when the network 16 capable of communicating with the server apparatus 10 is selected as the coupling destination. Further, when the network 18 capable of communicating with the imaging apparatus 14 is selected as the coupling destination, the client terminal 12 performs a firmware updating process with the imaging apparatus 14.

Firmware Downloading Process

FIG. 7 is a flowchart of an example of a firmware downloading process. In step S21, the latest firmware version information acquisition unit 24 of the client terminal 12 requests the server apparatus 10 for the latest firmware version information and acquires the latest firmware version information. In a case of the latest firmware version information acquisition unit 24 of the client terminal 12 being unable to acquire the latest firmware version information, the client terminal 12 terminates the firmware downloading process illustrated in FIG. 7.

Upon acquiring the latest firmware version information, the latest firmware version information acquisition unit 24 reports the acquired latest firmware version information to the firmware download control unit 26. The firmware download control unit 26 proceeds to step S22 and refers to the firmware version information stored in the firmware version information storage 32.

FIG. 8 is a configuration diagram of an example of firmware version information.

The firmware version information in FIG. 8 includes the downloaded firmware version from the server apparatus 10 and the firmware version of the most recently coupled imaging apparatus 14.

The firmware download control unit 26 compares the latest firmware version with the downloaded firmware version from the server apparatus 10 and determines whether the latest firmware has been downloaded from the server apparatus 10. When the latest firmware has already been downloaded from the server apparatus 10, the firmware download control unit 26 ends the firmware downloading process illustrated in FIG. 7. When the latest firmware has not been downloaded from the server apparatus 10, the firmware download control unit 26 proceeds to step S24.

The firmware download control unit 26 compares the latest firmware version with the latest firmware version of the most recently coupled imaging apparatus 14 and determines whether the firmware of the imaging apparatus 14 is the latest version. When the firmware of the imaging apparatus 14 is the latest version, the firmware download control unit 26 ends the firmware downloading process illustrated in FIG. 7.

When the firmware of the imaging apparatus 14 is not the latest version, the firmware download control unit 26 proceeds to step S25 and displays a download identification pop-up as illustrated in FIG. 9.

FIG. 9 is an image diagram of an example of a download identification pop-up. The download identification pop-up may enable a user to select either "Download Now" or "Not Now" with respect to the latest firmware. When the user presses "Not Now" from the pop-up in FIG. 9 (NO in step S26), the firmware download control unit 26 closes the pop-up in FIG. 9 and ends the firmware downloading process illustrated in FIG. 7. Note that the firmware download control unit 26 may receive from the user the setting of the pop-up re-display condition such as the time interval until the next display of the pop-up.

When the user presses "Download Now" from the pop-up in FIG. 9 (YES in step S26), the firmware download control unit 26 proceeds to step S27. In step S27, the firmware download control unit 26 displays a firmware update screen as illustrated in FIG. 10.

FIG. 10 is an image diagram of an example of a firmware update screen. The firmware update screen receives an instruction to "download firmware to application" from the user. When the user presses "download firmware to application", the firmware download control unit 26 displays a firmware download in progress pop-up illustrated in FIG. 11. FIG. 11 is an image diagram of an example of a firmware download in progress pop-up.

The firmware download control unit 26 downloads the latest firmware from the server apparatus 10 and stores the downloaded latest firmware in the firmware storage 34. Upon completion of downloading the latest firmware from the server apparatus 10, the firmware download control unit 26 closes the pop-up illustrated in FIG. 11, and ends the firmware downloading process illustrated in FIG. 7.

Note that the firmware update screen, on which the "download firmware to application" button illustrated in FIG. 10 is displayed, may also be displayed, for example, when a predetermined condition is satisfied at the time of transitioning from the setting screen of FIG. 12 to the firmware update screen of FIG. 10. FIG. 12 is an image diagram of an example of a setting screen that may transition to a firmware update screen.

For example, when the firmware version of the most recently coupled imaging apparatus 14 is older than the already downloaded firmware version, the firmware download control unit 26 displays the firmware update screen of FIG. 10.

Firmware Updating Process

FIG. 13 is a flowchart of an example of a firmware updating process. In step S31, the firmware update control unit 28 of the client terminal 12 refers to the firmware version information in FIG. 8. The firmware update control unit 28 compares the downloaded firmware version with the firmware version of the most recently coupled imaging apparatus 14 to determine whether the firmware version of the most recently coupled imaging apparatus 14 is older than the downloaded firmware version.

When the firmware version of the most recently coupled imaging apparatus 14 is not older than the downloaded firmware version, the firmware update control unit 28 ends the firmware updating process illustrated in FIG. 13. When the firmware version of the most recently coupled imaging apparatus 14 is older than the downloaded firmware version, the firmware update control unit 28 proceeds to step S33, and displays the update identification pop-up illustrated in FIG. 14.

FIG. 14 is an image diagram of an example of an update identification pop-up. The update identification pop-up may enable a user to select either "Update Now" or "Not Now" with respect to the latest firmware. When the user presses "Not Now" from the pop-up in FIG. 14 (NO in step S34), the firmware update control unit 28 closes the pop-up in FIG. 14 and ends the firmware updating process illustrated in FIG. 13. Note that the firmware update control unit 28 may receive from the user the setting of the pop-up re-display condition such as the time interval until the next display of the pop-up.

When the user presses "update" from the pop-up in FIG. 14 (YES in step S34), the firmware update control unit 28 displays a firmware update screen as illustrated in FIG. 15.

FIG. 15 is an image diagram of an example of a firmware update screen. The firmware update screen receives an instruction to "update firmware" from the user. When the user presses "update firmware", the firmware update control unit 28 proceeds to step S35.

In step S35, the firmware update control unit 28 checks the battery remaining level reported from the imaging apparatus battery remaining level monitoring unit 30. When the remaining battery level of the imaging apparatus 14 is equal to or greater than a predetermined level (e.g., the remaining battery level is ⅓), the firmware update control unit 28 proceeds to step S37. In step S37, the firmware update control unit 28 displays a firmware transfer in progress pop-up illustrated in FIG. 16. FIG. 16 is an image diagram of an example of a firmware transfer in progress pop-up.

The firmware update control unit 28 executes an updating process of the firmware installed in the imaging apparatus 14 by using the firmware stored in the firmware storage 34. Upon completion of the firmware updating process, the firmware update control unit 28 displays a pop-up illustrated in FIG. 17. FIG. 17 is an image diagram of an example of a pop-up prompting restart of the imaging apparatus. For example, by displaying a pop-up as illustrated in FIG. 17, the firmware update control unit 28 is enabled to prompt the user to restart the imaging apparatus 14 whose firmware update has been completed.

When the remaining battery level of the imaging apparatus 14 is not the predetermined level or greater, the firmware update control unit 28 proceeds to step S38. In step S38, the firmware update control unit 28 displays a remaining battery level warning pop-up illustrated in FIG. 18. FIG. 18 is an image diagram of an example of the imaging apparatus remaining battery level warning pop-up. For example, by displaying a pop-up as illustrated in FIG. 18, the firmware update control unit 28 is enabled to report to the user that the remaining battery level of the imaging apparatus 14 is low such that the firmware update may fail to be performed. Further, the firmware update control unit 28 may prompt the user to charge the imaging apparatus 14 using the pop-up illustrated in FIG. 18.

Note that the firmware update screen, on which the "update firmware" button illustrated in FIG. 15 is displayed, may also be displayed, for example, when a predetermined condition is satisfied at the time of transitioning from the setting screen of FIG. 12 to the firmware update screen of FIG. 15.

For example, when the firmware version of the most recently coupled imaging apparatus 14 is older than the already downloaded firmware version, the firmware download control unit 26 displays the firmware update screen of FIG. 15.

Outline

As described above, according to the first embodiment, the client terminal 12 performs the firmware downloading process of step S13 with the server apparatus 10 while the client terminal 12 is in a communicable state with the server apparatus 10. Then, after the client terminal 12 is switched to a state capable of communicating with the imaging apparatus 14, the client terminal 12 performs the firmware updating process in step S15 with the imaging apparatus 14. The imaging apparatus 14 that is designed to be communicably coupled to the client terminal 12 at the time of imaging or the like is enabled to couple to the client terminal 12 every time a user attempts to use the imaging apparatus 14 for imaging, the user may be promptly informed that firmware update is ready (available).

Hence, according to the first embodiment, the firmware installed in the imaging apparatus 14 may be updated promptly.

Example 2

Second Embodiment

The following describes a second embodiment, in which the firmware updating process is performed subsequent to the firmware downloading process. Since the second embodiment is partially similar to the first embodiment, duplicated description is appropriately omitted.

Process Outline in Client Terminal

The client terminal 12 according to the present embodiment performs a firmware downloading process and a firmware updating process according to a procedure as illustrated in FIG. 19, for example. FIG. 19 is a flowchart of an example illustrating a process outline with respect to the client terminal according to the second embodiment. In step S101, the client terminal 12 activates the imaging apparatus 14 application, for example, by receiving a user operation.

In step S102, the client terminal 102 determines whether the client terminal 12 is communicably coupled to the server apparatus 10. When the client terminal 12 is communicably coupled to the server apparatus 10, the client terminal 12 performs the firmware downloading process in step S103. The firmware downloading process in step S103 is similar to that in step S13.

In step S104, the client terminal 12 determines whether downloading of the firmware has been executed in step S103. When downloading of the firmware has not been executed in step S103, the client terminal 12 performs various processes in step S111.

When downloading of the firmware has been executed in step S103, the client terminal 12 proceeds to step S105 and displays an update identification pop-up as illustrated in FIG. 20. FIG. 20 is an image diagram of an example of the update identification pop-up displayed after downloading is completed. The update identification pop-up may enable a user to select either "Update Now" or "Not Now" with respect to the latest firmware.

When the user presses "Not Now" from the pop-up illustrated in FIG. 20 (NO in step S106), the client terminal 12 closes the pop-up illustrated in FIG. 20 and performs various processes in step S111.

When the user presses "Update Now" from the pop-up in FIG. 20 (YES in step S106), the client terminal 12 proceeds to step S107. In step S107, the client terminal 107 determines whether the client terminal 12 is communicably coupled to the imaging apparatus 14. When the client terminal 12 is communicably coupled to the imaging apparatus 14 (YES in step S107), the client terminal 12 proceeds to step S108, performs a later-described firmware updating process, and then performs various processes in step S111.

When the client terminal 12 is not communicably coupled to the server apparatus 10, the client terminal 12 proceeds to step S109 and determines whether the client terminal 12 is communicably coupled to the imaging apparatus 14. When the client terminal 12 is communicably coupled to the imaging apparatus 14, the client terminal 12 performs the firmware updating process in step S110. The firmware updating process in step S110 is similar to that in step S15. When the firmware updating process has been performed in step S110, the client terminal 12 performs various processes in step S111.

Firmware Updating Process

The firmware updating process of step S108 may be performed according to a procedure of a flowchart illustrated in FIG. 21. FIG. 21 is a flowchart of an example of a firmware updating process. Since the firmware updating process of FIG. 21 is performed after the firmware downloading process, the processes of steps S31 to S34 of the firmware updating process of FIG. 13 are omitted.

In step S121, the firmware update control unit 28 checks the battery remaining level reported from the imaging apparatus battery remaining level monitoring unit 30. When the remaining battery level of the imaging apparatus 14 is equal to or greater than a predetermined level, the firmware update control unit 28 proceeds to step S123. In step S123, the firmware update control unit 28 executes a firmware updating process similar to step S37.

When the remaining battery level of the imaging apparatus 14 is not the predetermined level or greater, the firmware update control unit 28 proceeds to step S124. In step S124, the firmware update control unit 28 displays a remaining battery level warning pop-up similar to step S38.

Outline

According to the second embodiment, the firmware updating process may be performed subsequent to the firmware downloading process. Hence, according to the present embodiment, the firmware installed in the imaging apparatus 14 may be updated promptly.

The present invention is not limited to the specifically disclosed embodiments described above, and various modifications and alterations may be made without departing from the scope of the claims.

The imaging apparatus 14 is an example of the "electronic apparatus having firmware installed therein" recited in the claims. The firmware download control unit 26 is an example of a firmware acquisition control unit. The firmware update control unit 28 is an example of a firmware update control unit. The latest firmware version information acquisition unit 24 is an example of a latest version information acquisition unit. The imaging apparatus battery remaining level monitoring unit 30 is an example of a battery remaining level monitoring unit. The coupling destination switching unit 22 is an example of a coupling destination switching unit.

REFERENCE SIGNS LIST

1 information processing system
10 server apparatus
12 client terminal
14 imaging apparatus
16,18 network
20 communication processing unit
22 coupling destination switching unit
24 the latest firmware version information acquisition unit
26 firmware download control unit
28 firmware update control unit
30 imaging apparatus remaining battery level monitoring unit
32 firmware version information storage
34 firmware storage
501 input apparatus
502 display apparatus
503 external I/F
503a recording media
504 RAM
505 ROM
506 CPU
507 communication I/F
508 HDD
601 CPU
602 ROM
603 RAM
604 EEPROM
605 CMOS sensor
606 acceleration-direction sensor
607 recording medium
608 media drive
609 audio input unit
610 audio output unit
611 antenna
612 communication unit
613 wireless LAN communication section
614 near field communication antenna
615 near field communication unit
616 display
617 touch panel
618 battery
619 bus line
701 imaging unit
702 lens
703 image pickup device
704 image processing unit
705 imaging control unit
706 microphone
707 sound processing unit
710 bus
711 CPU
712 ROM
713 SRAM
714 DRAM
715 operation unit
716 Network I/F
717 communication unit
717a antenna
718 electronic compass
B bus The present application is based on and claims the benefit of priority of Japanese Priority Application No. 2016-153502 filed on Aug. 4, 2016, the entire contents of which are hereby incorporated herein by reference.

The invention claimed is:

1. An information processing system comprising:
an electronic apparatus having firmware installed therein; and
a client terminal configured to be coupled to the electronic apparatus or to a server apparatus configured to provide the firmware through switching between the electronic apparatus and a network to a coupling destination, wherein the client terminal includes
a processor; and
a memory storing program instructions that cause the processor to:
determine whether the client terminal is communicably coupled to the server apparatus, wherein
in a case where the processor determines that the client terminal is communicably coupled to the server apparatus, the processor:
acquires, from the server apparatus, version information of the firmware stored at the server apparatus,
acquires the updated firmware from the server apparatus in a case where the processor determines that the acquired version information indicates the firmware stored at the server apparatus is capable of updating the firmware of the electronic apparatus,
stores the acquired updated firmware in a firmware storage of the memory at the client terminal, and
updates the firmware installed in the electronic apparatus with the firmware stored in the firmware storage in response to the user inputting the instruction to install the acquired updated firmware version in the electronic apparatus, and
in a case where the processor determines that the client terminal is not communicably coupled to the server apparatus, the processor:
determines whether the client terminal is communicably coupled to the electronic apparatus,
determines whether the firmware stored in the firmware storage of the memory at the client terminal is capable of updating the firmware of the electronic apparatus, based on the version information of the firmware stored in the firmware storage, and
updates the firmware installed in the electronic apparatus with the firmware stored in the firmware storage in response to the user inputting the instruction to install the stored firmware version in the electronic apparatus.

2. The information processing system according to claim 1, wherein
the electronic apparatus enables a user to use a function of the electronic apparatus by utilizing a function of the client terminal communicably coupled to the electronic apparatus.

3. The information processing system according to claim 1, wherein
the selection screen displays the version information of the firmware capable of being provided by the server apparatus, version information of the firmware already acquired by the client terminal, and version information of the firmware installed in the electronic apparatus.

4. The information processing system according, to claim 1, wherein the program instructions further cause the processor to
in a case where the updated firmware version present at the server apparatus, display a selection screen to enable a user to determine whether to update the firmware installed in the electronic apparatus, based on version information of the firmware already acquired by the client terminal and version information of the firmware installed in the electronic apparatus.

5. The information processing system according, to claim 1, wherein the program instructions further cause the processor to
monitor a remaining battery level of the electronic apparatus, wherein
in a case where the battery remaining level of the electronic apparatus reported from the remaining battery level monitoring unit is at a predetermined value or greater, the firmware update control unit updates the firmware installed in the electronic apparatus, and
in a case where the battery remaining level of the electronic apparatus reported from the remaining battery level monitoring unit is not at a predetermined value or greater, the firmware update control unit displays a battery remaining level warning screen without updating the firmware installed the electronic apparatus.

6. The information processing system according to claim 1, wherein the program instructions further cause the processor to
switch between a first wireless communication network and a second wireless communication network, each communication network acting as a coupling destination, and
wherein the first wireless communication network communicates with the server apparatus, and the second wireless communication network communicates with the electronic apparatus.

7. The information processing system according to claim 1, wherein
the electronic apparatus is an imaging apparatus configured to capture an image, and is communicably coupled to the client terminal, such that the electronic apparatus uses a display function of the client terminal to display the captured imaging data.

8. The information processing system according to claim 7, wherein
the electronic apparatus uses a touch panel function of the client terminal to receive an operation from a user.

9. The information processing system according to claim 1, wherein
in the case where the processor determines that the client terminal is communicably coupled to the server apparatus, the program instructions further cause processor to:
determine whether an updated firmware, capable of updating the firmware of the electronic apparatus, is present at the server apparatus based on the acquired version information.

10. The information processing system according to claim 1, wherein in the case where the processor determines that the client terminal is communicably coupled to the server apparatus, the program instructions further cause processor to:
display a selection screen that includes a predetermined character string indicating to a user that acquisition of the firmware from the server apparatus is completed, and includes a user interface that prompts the user to input an instruction to indicate whether to install the acquired updated firmware version in the electronic apparatus.

11. The information processing system according to claim 1, wherein
in the case where the processor determines that the client terminal is not communicably coupled to the server apparatus, the program instructions further cause processor to:
display, in a case where the processor determines that the stored version information indicates the firmware stored in the firmware storage of the memory is capable of updating the firmware of the electronic apparatus, a selection screen that includes the predetermined character string indicating to the user that the stored firmware is capable of updating the firmware of the electronic apparatus, and includes the user interface that prompts the user to input an instruction to indicate whether to install the stored fimiware version in the electronic apparatus.

12. A client terminal configured to be communicably coupled to the electronic apparatus or to a server apparatus configured to provide firmware through switching between the electronic apparatus and a network to a coupling destination, the client terminal comprising:
a processor; and
a memory storing program instructions that cause the processor to
determine whether the client terminal is communicably coupled to the server apparatus, and
acquire, from the server apparatus, version information of the firmware stored at the server apparatus in a case where the processor determines that the client terminal is communicably coupled to the server apparatus, wherein
in a case where the processor determines that the client terminal is communicably coupled to the server apparatus, the processor:
acquires the updated firmware from the server apparatus in a case where the processor determines that the acquired version information indicates the firmware stored at the server apparatus is capable of updating the firmware of the electronic apparatus,
stores the acquired firmware in a firmware storage of the memory at the client terminal; and
updates the firmware installed in the electronic apparatus to the firmware stored in the firmware storage in response to the user inputting the instruction to install the acquired updated firmware version in the electronic apparatus, and
in a case where the processor determines that the client terminal is not communicably coupled to the server apparatus, the processor:
determines whether the client terminal is communicably coupled to the electronic apparatus,
determines whether the firmware stored in the firmware storage of the memory at the client terminal is capable of updating the firmware of the electronic apparatus, based on the version information of the firmware stored in the firmware storage, and updates the firmware installed in the electronic apparatus with the firmware stored in the firmware storage in response to the user inputting the instruction to install the stored firmware version in the electronic apparatus.

13. The client terminal according to claim 12, wherein in the case where the processor determines that the client terminal is communicably coupled to the server apparatus, the program instructions further cause processor to:

determine whether an updated firmware, capable of updating the firmware of the electronic apparatus, is present at the server apparatus based on the acquired version information.

14. The client terminal according to claim 12, wherein in the case where the processor determines that the client terminal is communicably coupled to the server apparatus, the program instructions further cause processor to:

display a selection screen that includes a predetermined character string indicating to a user that acquisition of the firmware from the server apparatus is completed, and includes a user interface that prompts the user to input an instruction to indicate whether to install the acquired updated firmware version in the electronic apparatus.

15. The client terminal according to claim 12, wherein in the case where the processor determines that the client terminal is not communicably coupled to the server apparatus, the program instructions further cause processor to:

display, in a case where the processor determines that the stored version information indicates the firmware stored in the firmware storage of the memory is capable of updating the firmware of the electronic apparatus, a selection screen that includes the predetermined character string indicating to the user that the stored firmware is capable of updating the firmware of the electronic apparatus, and includes the user interface that prompts the user to input an instruction to indicate whether to install the stored firmware version in the electronic apparatus.

16. A control method executed by a processor of a client terminal, the client terminal being configured to be communicably coupled to an electronic apparatus or to a server apparatus configured to provide firmware through switching between the electronic apparatus and a network to a coupling destination, the control method comprising:

determining whether the client terminal is communicably coupled to the server apparatus, and acquiring, from the server apparatus, version information of the firmware stored at the server apparatus in a case where it is determined that the client terminal is communicably coupled to the server apparatus, wherein in a case where it is determined that the client terminal is communicably coupled to the server apparatus, the processor:

acquires the updated firmware from the server apparatus in a case where the processor determines that the acquired version infoitnation indicates the firmware stored at the server apparatus is capable of updating the firmware of the electronic apparatus, stores the acquired firmware in a firmware storage of the memory at the client terminal; and updates the firmware installed in the electronic apparatus to the firmware stored in the firmware storage in response to the user inputting the instruction to install the acquired updated firmware version in the electronic apparatus, and in a case where it is determined that the client terminal is not communicably coupled to the server apparatus, the processor:

determines whether the client terminal is communicably coupled to the electronic apparatus, determines whether the firmware stored in the firmware storage of the memory at the client terminal is capable of updating the firmware of the electronic apparatus, based on the version information of the firmware stored in the firmware storage, and updates the firmware installed in the electronic apparatus with the firmware stored in the firmware storage in response to the user inputting the instruction to install the stored firmware version in the electronic apparatus.

17. The control method according to claim 16 further comprising:

determining whether an updated firmware capable of updating the firmware of the electronic apparatus is present at the server apparatus based on the acquired version information in the case where it is determined that the client terminal is communicably coupled to the server apparatus.

18. The control method according to according to claim 16 further comprising:

displaying a selection screen in the case where it is determined that the client terminal is communicably coupled to the server apparatus, the selection screen including a predetermined character string that indicates to a user completion of the acquisition of the firmware from the server apparatus, and a user interface that prompts the user to input an instruction to indicate whether to install the acquired updated firmware version in the electronic apparatus.

19. The control method according to according to claim 16 further comprising:

displaying a selection screen in the case where it is determined that the client terminal is not communicably coupled to the server apparatus and that the stored version information indicates the firmware stored in the firmware storage of the memory is capable of updating the firmware of the electronic apparatus, the selection screen including a predetermined character string that indicates to a user the stored firmware is capable of updating the firmware of the electronic apparatus, and a user interface that prompts the user to input an instruction to indicate whether to install the stored firmware version in the electronic apparatus.

* * * * *